United States Patent [19]

Kaihara et al.

[11] Patent Number: 5,448,334
[45] Date of Patent: Sep. 5, 1995

[54] CAMERA WITH SELECTIVE INCREMENTAL CHANGES IN EXPOSURE VALUES

[75] Inventors: Shoji Kaihara; Toshio Matsumoto, both of Kanagawa, Japan

[73] Assignee: Canon Kabushiki Kaisha, Tokyo, Japan

[21] Appl. No.: 255,816

[22] Filed: Jun. 7, 1994

Related U.S. Application Data

[63] Continuation of Ser. No. 772,954, Oct. 8, 1991, abandoned.

[30] Foreign Application Priority Data

Oct. 11, 1990 [JP] Japan .................. 2-273592
Oct. 11, 1990 [JP] Japan .................. 2-273593

[51] Int. Cl.⁶ ................................ G03B 7/00
[52] U.S. Cl. ................................ 354/486
[58] Field of Search ............... 354/486, 289.1, 289.11, 354/289.12, 288

[56] References Cited

U.S. PATENT DOCUMENTS

| | | | |
|---|---|---|---|
| 4,104,649 | 8/1978 | Tanaka et al. | 354/289 |
| 4,687,308 | 8/1987 | Someya | 354/289.1 X |
| 4,710,008 | 12/1987 | Tosaka et al. | 354/289.1 |
| 4,742,367 | 5/1988 | Amano et al. | 354/289.1 |
| 4,837,596 | 6/1989 | Kawamura | 354/289.1 X |
| 4,890,134 | 12/1989 | Fujino et al. | 354/289.1 |
| 4,967,216 | 10/1990 | Nishio et al. | 354/173.1 |

*Primary Examiner*—Howard B. Blankenship
*Attorney, Agent, or Firm*—Fitzpatrick, Cella, Harper & Scinto

[57] ABSTRACT

A camera includes at least two digital signal input devices for inputting exposure information, a processing circuit arranged to receive signals from the digital signal input devices and to process exposure information, and a switch-over device for switching over an amount of step of modification of an exposure information value inputted by at least one of the digital signal input devices.

18 Claims, 20 Drawing Sheets

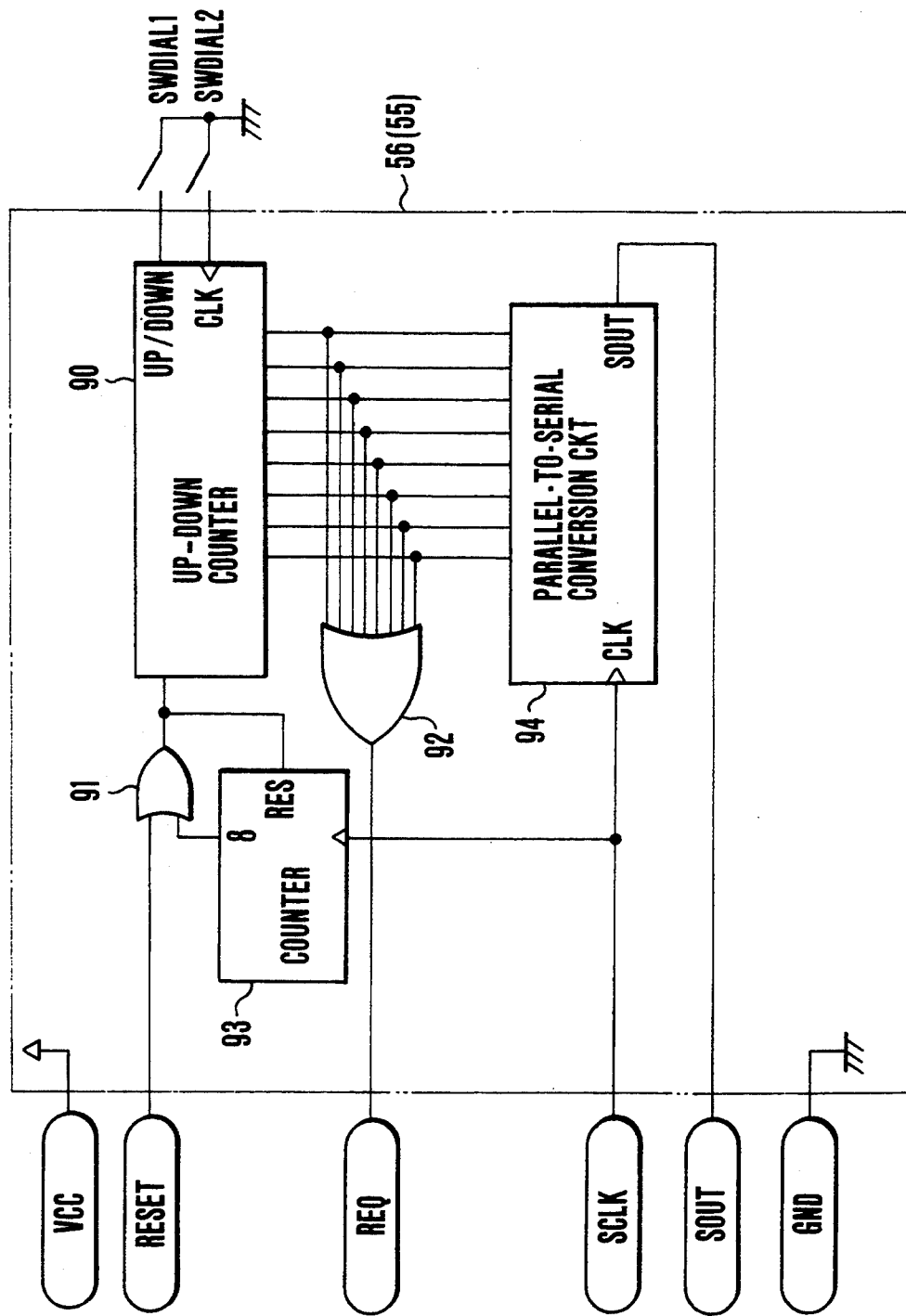

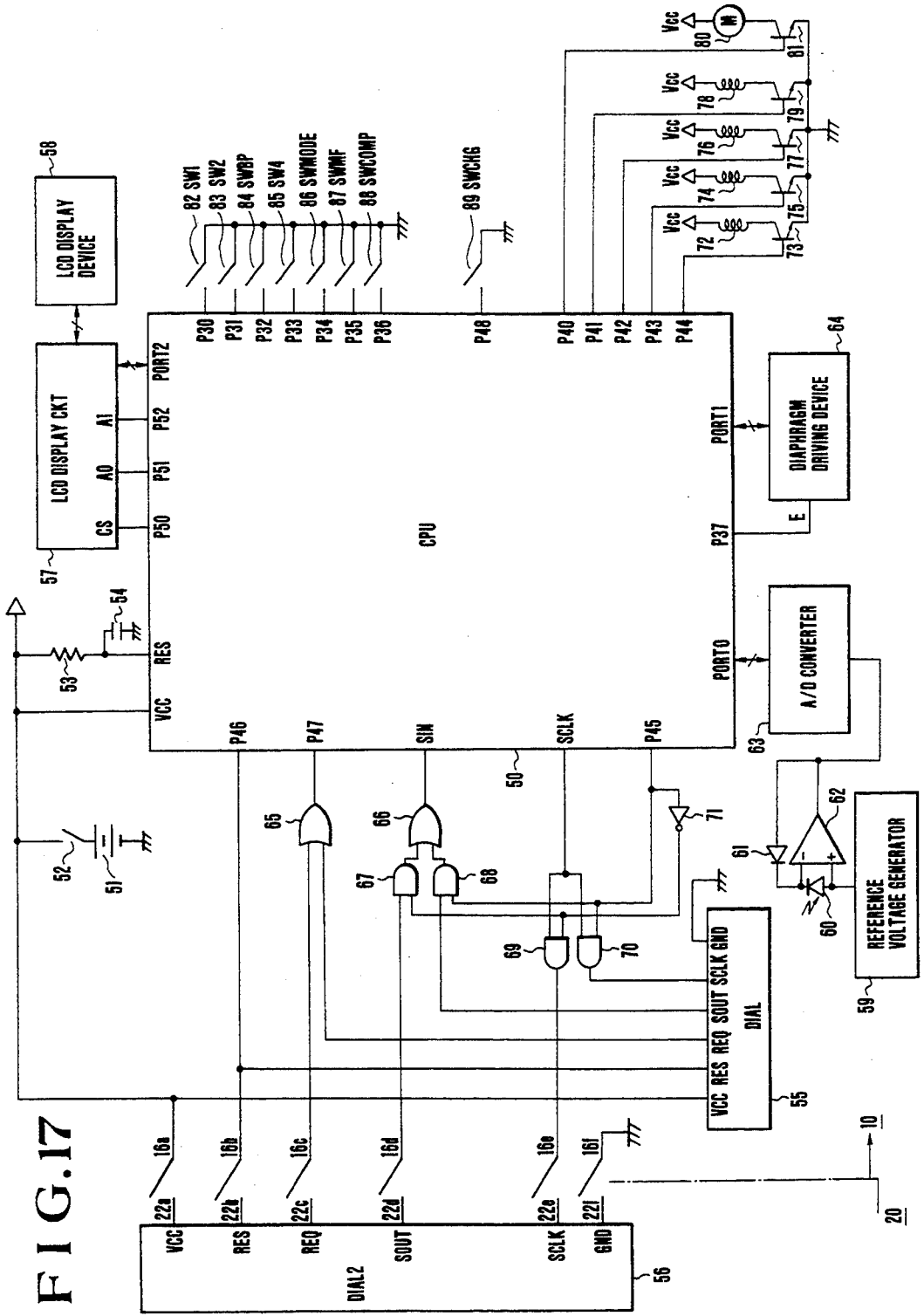
F I G. 17

CAMERA WITH SELECTIVE INCREMENTAL CHANGES IN EXPOSURE VALUES

This application is a continuation of application Ser. No. 07/772,954 filed Oct. 8, 1991, now abandoned.

BACKGROUND OF THE INVENTION

1. Field of the Invention

This invention relates to a camera having an information input device for inputting exposure information by using a digital information input means.

2. Description of the Related Art

The conventional input means for inputting exposure information to a camera includes, among others, an input device which has its own members such as a shutter speed dial, a F-stop ring, etc. for exposure information of varied kinds. The conventional input means is arranged to permit independent input and also input of an analog signal generated by a variable resistor or the like interlocked with the shutter dial, the F-stop ring, etc. The input device is arranged to have the shutter speed dial, the F-stop ring, etc. thereof connected directly to mechanisms such as a shutter device and a diaphragm, which are arranged to be driven and controlled.

Further, as a result of the recent advancement of the electronic technology, various input devices have been proposed such as an input device for inputting exposure information in the form of a digital signal by means of a dial and a button, etc. This device is arranged, for example, to permit the input of a first kind of information by operating only the dial and the input of a second kind of information by simultaneously operating the dial and the button, as disclosed, for example, in U.S. Pat. No. 4,967,216. Another input device is arranged to permit the input of various kinds of information by using two dials, for example, as disclosed in U.S. Pat. No. 4,967,216. A further input device is arranged to permit input of information (on setting values) by using a pair of buttons including an up-count button and a down-count button, for example, as disclosed in U.S. Pat. No. 4,710,008.

However, the above-stated prior art devices have the following shortcomings:

(1) Since the dial is provided for one purpose, the device allows no latitude to the mode of operation.
(2) The mechanism of the device becomes complex to cause an increase in cost.
(3) The input cannot be made by fine steps as the rotation angle of the operation dial is restricted.
(4) The operation members is not arranged to permit switch-over of input information.
(5) The amount of information input per step by each information input means is unvariable.
(6) Input steps cannot be variously set according to the kind of input information.

The prior art input devices thus have been hardly satisfactory in terms of operability.

SUMMARY OF THE INVENTION

One aspect of this invention resides in the provision of a camera, which is arranged to permit input of accurate information as desired by the photographer. To solve the above-stated problems of the prior art, the camera according to this invention comprises: at least two digital signal input means; means for switching over an amount of step of modification of an exposure information value input ted from at least one of the two digital signal input means; and a processing circuit arranged to receive a signal from each of the two digital signal input means and to process exposure information.

The above and other aspects and features of the invention will become apparent from the following detailed description of embodiments thereof taken in conjunction with the accompanying drawings.

BRIEF DESCRIPTION OF THE DRAWINGS

FIG. 9 shows the details of a dial circuit shown in FIG. 8.

FIG. 17 is a circuit diagram showing the whole circuit arrangement of the second embodiment.

DETAILED DESCRIPTION OF THE PREFERRED EMBODIMENTS

Figure 1:
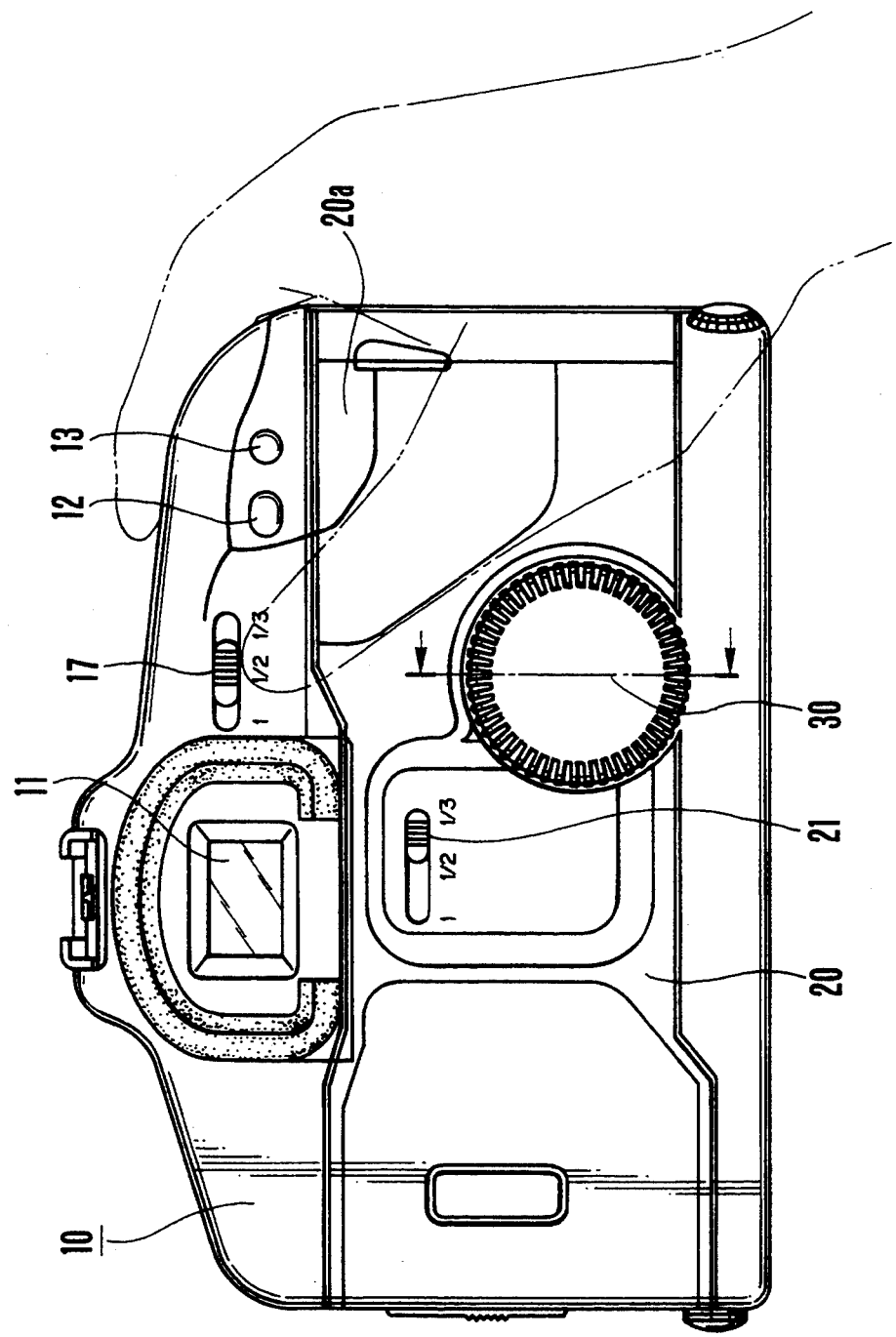
FIG. 1 is a rear view of a camera arranged as a first embodiment of this invention.
Figure 2:
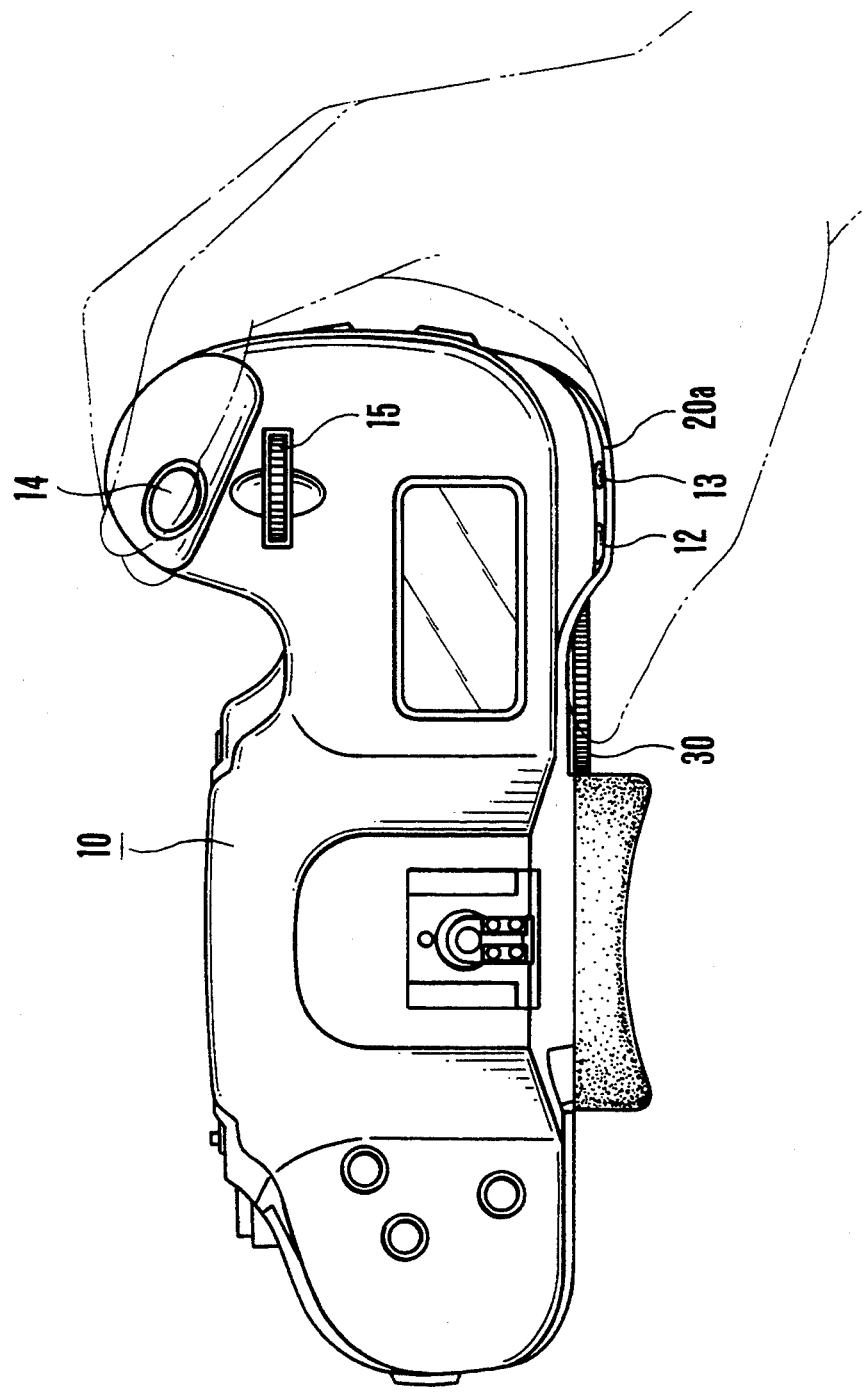
FIG. 2 is a top view of the same camera.
Figure 3:
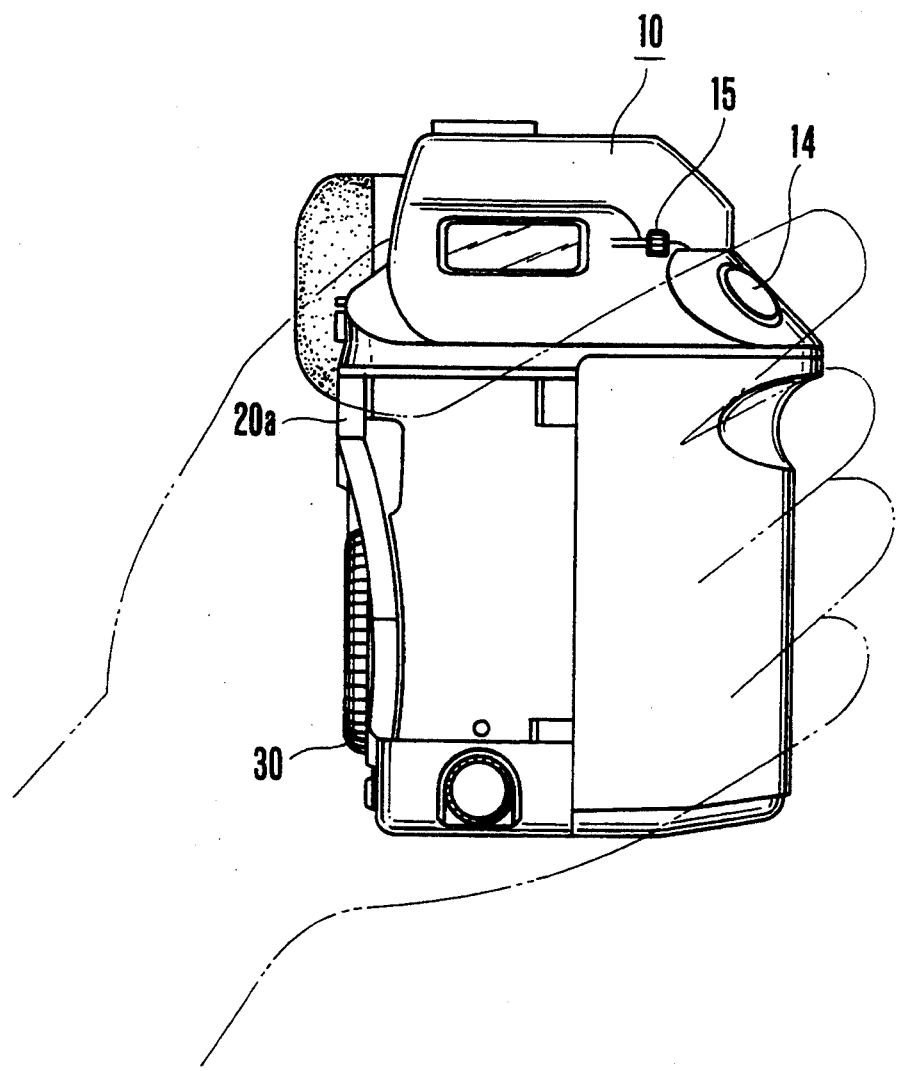
FIG. 3 is a side view of the same camera.

In FIGS. 1 to 4, which show a camera arranged according to this invention as a first embodiment thereof, a reference numeral 10 denotes the body of the camera. A numeral 11 denotes an eyepiece part. A numeral 12 denotes a button to be operated in setting an exposure compensation value or an aperture value. A numeral 13 denotes a known AE (automatic exposure) lock button. A numeral 14 denotes a shutter release button. A numeral 15 denotes a multi-function dial which is provided for inputting information of varied kinds. The button 12 is arranged to serve as an exposure compensation button when the camera is set in an automatic exposure control mode and as an aperture setting button for setting the aperture of a photo-taking lens when the camera is set in a manual exposure mode. Either an exposure compensation value is inputted or an aperture value is set when the above-stated dial 15 is operated by rotating it at the same time as this button 12 is pushed.

A reference numeral 20 denotes a back lid. A numeral 20a denotes a finger putting part which is located on the back lid 20 and arranged to have a thumb put there in holding the camera. A numeral 30 denotes a multifunction dial which is disposed on the surface of the back lid 20. The multi-function dial 30 has a rotation shaft extending approximately in parallel to the optical axis of the photo-taking lens and is located below the finger putting part 20a, so that the dial 30 can be operated to input information by just slightly moving the thumb from the finger putting part 20a. A numeral 17 denotes a three-position switch which is arranged to permit selection of switch-over of the step of varying an exposure control value such as a shutter time value or an aperture value inputted by means of the dial 15 between varying the value by one step, varying the value by $\frac{1}{2}$ step or varying the value by $\frac{1}{3}$ step. A numeral 21 denotes another three-position switch, which is arranged similarly to the switch 17, to permit switch-over of the step of varying the exposure control value between varying by one step, by $\frac{1}{2}$ step or by $\frac{1}{3}$ step.

Figure 4:
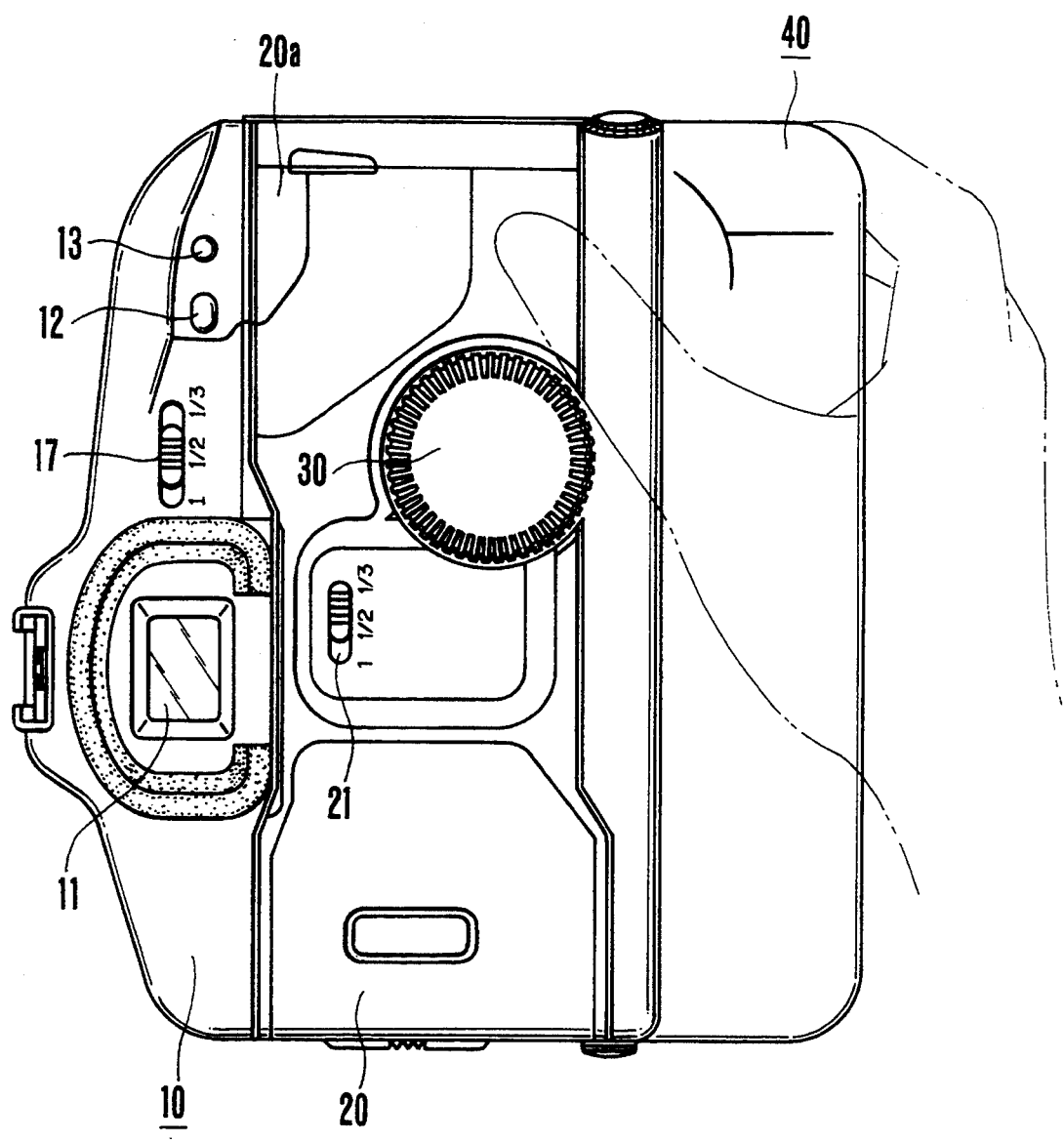
FIG. 4 is a rear view showing the same camera as in a vertical shooting posture with a high-speed film winding device mounted thereon.

FIG. 4 shows the camera as in a vertically held posture with a high-speed film winding device 40, which is mountable on the camera body 10, mounted on the camera body 10. The high-speed film winding device 40 includes a shutter release button which is not shown but is provided for a shutter release with the camera vertically held.

Figure 5:
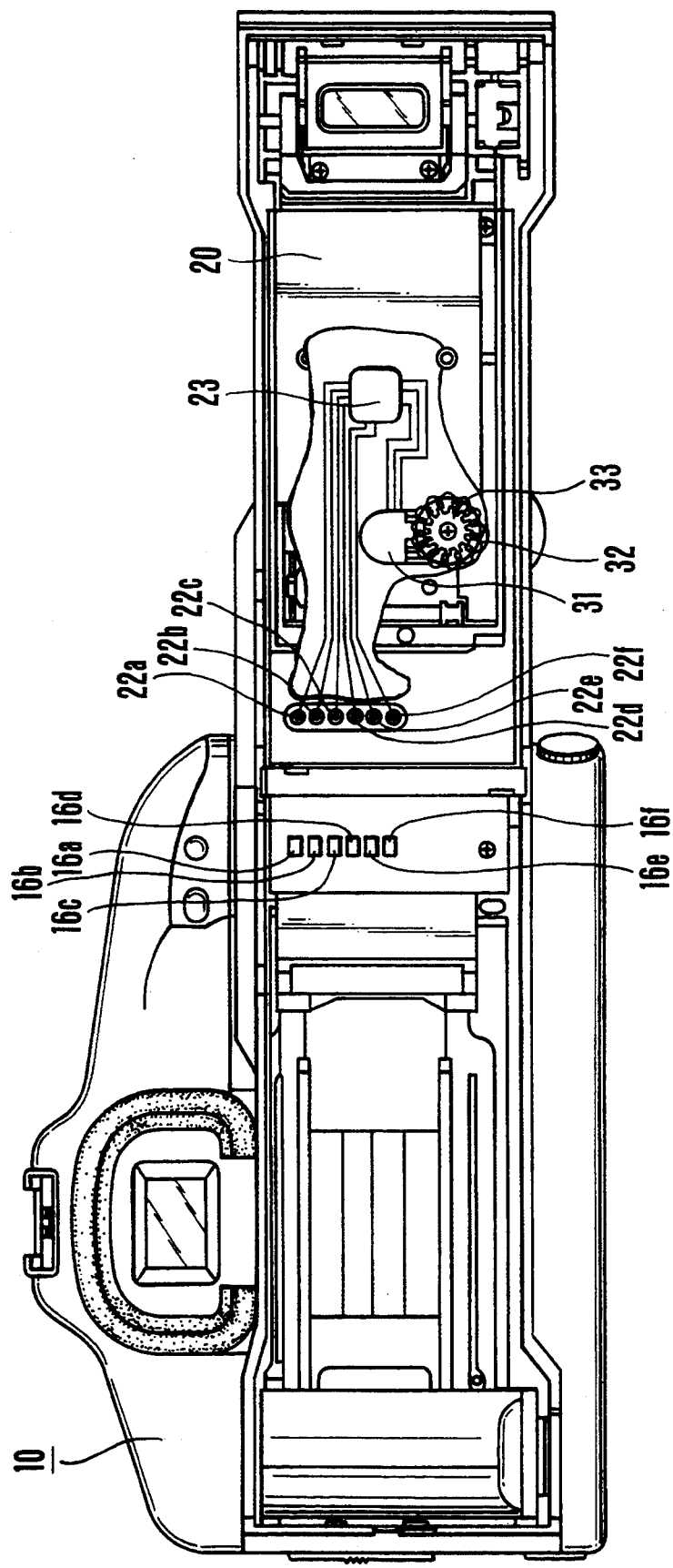
FIG. 5 is a partially sectional rear view showing the same camera as in a state of having its back lid opened.

FIG. 5 is a perspective view showing the camera as in a state of having the back lid 20 opened and showing in part the inside of the back lid 20.

Referring to FIG. 5, a group of contacts 16a to 16f of the camera body 10 are arranged to be in contact, when the back lid 20 is closed, with terminals 22a to 22f, which are provided on the back lid 20, for transmitting an input information signal, so that the information signal can be transmitted to a control circuit disposed within the camera body 10. A signal generating circuit 23, which is disposed on the side of the back lid 20, is arranged to generate a pulse signal in response to the rotation of the dial 30 and to output a signal for the control circuit of the camera body 10.

Figure 6:
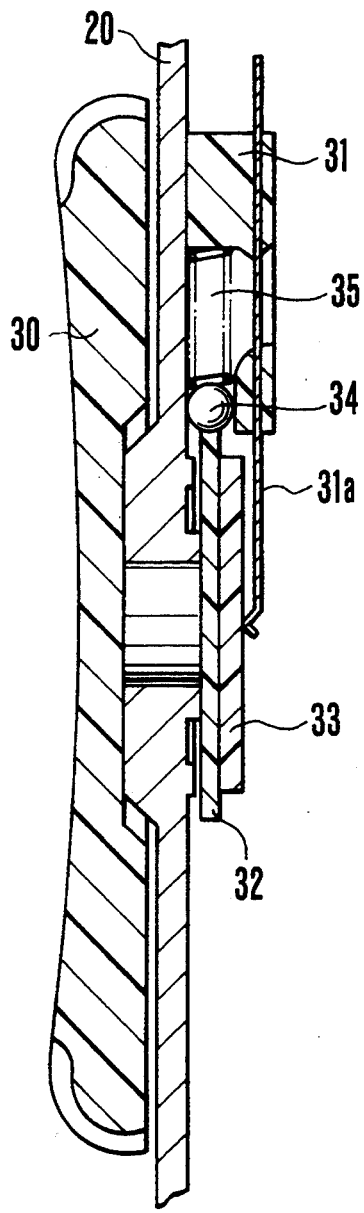
FIG. 6 is an enlarged sectional view of a dial shown in FIG. 3.
Figure 7:
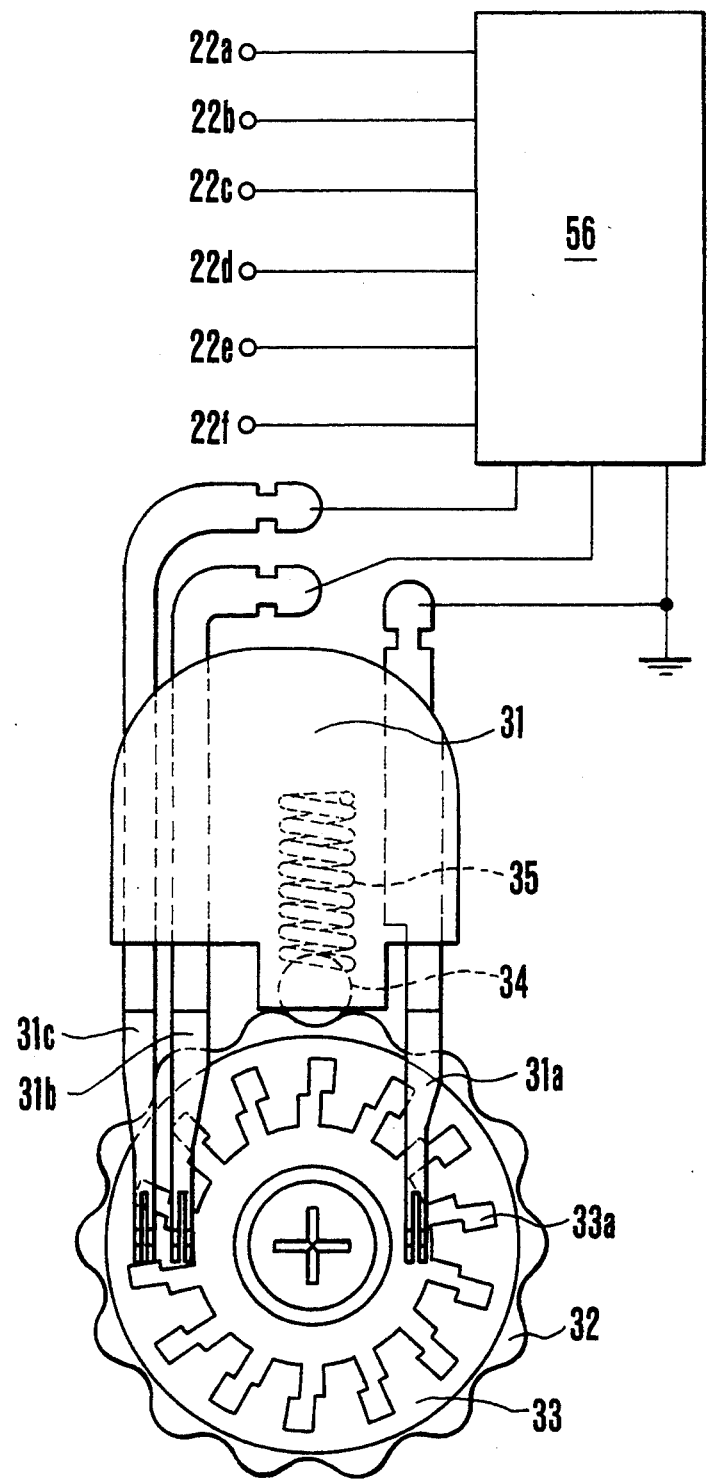
FIG. 7 shows the pattern of the dial shown in FIG. 6.

FIG. 6 is a sectional view of the dial part. FIG. 7 is an enlarged view of the dial part. Referring to these figures, a dial contact piece 31 is secured to the inside of the back lid 20 and is arranged to become conductive and to output a signal by coming into contact with a pattern 33a provided on a dial substrate 33, which is arranged to rotate along with the rotation of the dial 30. A group of signal output terminals 31a to 31c are provided on the dial contact piece 31. A click plate 32 is arranged to rotate integrally with the dial 30. The click plate 32 is provided with a ball 34, which is pushed by the urging force of a spring 35 against a hill- or valley-shaped part of the click plate 32. The click plate 32 is thus arranged to provide the dial 30 with clicks, which are evenly divided.

Next, the whole circuit arrangement of the camera, which is arranged as the first embodiment of this invention, is described below with reference to FIG. 8:

A microcomputer 50 (hereinafter referred to as CPU) is arranged to control the camera. A reference symbol VCC denotes a power supply terminal. A symbol RES denotes a reset terminal. A symbol PORT0 denotes an input part for an 8-bit parallel input. Symbols PORT1 and PORT2 denote output ports for 8-bit parallel outputs. Symbols P30, P31, P32, P33, P34, P35, P36, P37, P38 and P39 denote input ports. Symbols P40, P41, P42, P43, P44, P45 and P46 denote output ports. Symbols P47, P48 and P49 denote input ports. Symbols P50, P51 and P52 denote output ports. A symbol SCLK denotes a clock signal output for serial communication. A symbol SIN denotes a data input of serial communication.

Figure 10A:
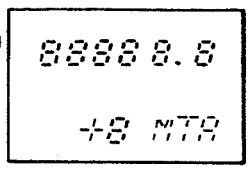
FIGS. 10(a) to 10(i) show the examples of LCD displays.

A reference numeral 51 denotes a power supply. A numeral 52 denotes a switch for turning the power supply 51 on. A numeral 53 denotes a resistor. A numeral 54 denotes a capacitor, which is arranged to reset the CPU 50 when the power supply 51 is turned on. A numeral 55 denotes a dial circuit which is arranged to read a value inputted from the dial 15. A numeral 56 denotes a dial circuit which is arranged to read a value inputted from the dial 30. The details of each of these dial circuits will be described later with reference to FIG. 9. A numeral 57 denotes a known LCD display circuit. A numeral 58 denotes an LCD display device. The whole display pattern of the LCD display device 58 is as shown in FIG. 10(a). The LCD display circuit 57 is arranged to take in addresses A0 and A1 and 8-bit data and to cause the LCD display device 58 to make a display when an input of the input terminal CS is at "1".

A numeral 59 denotes a reference voltage generator. A numeral 60 denotes an SPC, which is arranged to measure the luminance of an object to be photographed. A numeral 61 denotes a logarithmic compression diode. A numeral 62 denotes an operational amplifier. A numeral 63 denotes an A/D converter, which is arranged to A/D (analog-to-digital) convert the output of the operational amplifier 62 and to output it as light measurement data consisting of eight bits. A numeral 64 denotes a known diaphragm driving device, which is arranged to stop down the lens in accordance with the output value of the output port PORT1 of the CPU 50 and to output "1" from its terminal E in response to completion of the stopping-down of the lens. Numerals 65 and 66 denote OR gates. Numerals 67, 68, 69 and 70 denote AND gates. A numeral 71 denotes an inverter. A numeral 72 denotes an electromagnet, which is arranged to allow a trailing shutter curtain to travel. A numeral 73 denotes a transistor for control over a current to be applied to the electromagnet 72. A numeral 74 denotes an electromagnet, which is arranged to allow a leading shutter curtain to travel. A numeral 75 denotes a transistor for control over a current to be applied to the electromagnet 74.

A numeral 76 denotes an electromagnet, which is arranged to drive the diaphragm driving device 64. A numeral 77 denotes a transistor for control over a current to be applied to the electromagnet 76. A numeral 78 denotes an electromagnet, which is arranged to actuate a mechanical sequence of parts which are not shown. A numeral 79 denotes a transistor for control over a current to be applied to the electromagnet 78. A numeral 80 denotes a film winding motor. A numeral 81 denotes a transistor for control over a current to be applied to the motor 80. A numeral 82 denotes a light measurement switch (hereinafter referred to as switch SW1), which is arranged to turn on in response to the first stroke of the shutter release button 14. A numeral 83 denotes an exposure switch (hereinafter referred to as switch SW2), which is arranged to turn on in response to the second stroke of the shutter release button 14. A numeral 84 denotes a back lid switch (hereinafter referred to as switch SWBP), which is arranged to turn off when the back lid 20 is opened and to turn on when the back lid 20 is closed. A numeral 85 denotes a switch (hereinafter referred to as switch SW4), which is arranged to turn on when a mirror is moved upward and to turn off upon completion of film winding. A numeral 86 denotes a mode changing switch (hereinafter referred to as switch SWMODE). A numeral 87 denotes a function change-over switch (hereinafter referred to as switch SWMF). A numeral 88 denotes a switch (hereinafter referred to as switch SWCOMP), which is arranged to turn on When the exposure compensation button 12 is pushed.

A numeral 101 denotes a change-over switch (hereinafter referred to as switch SWCHG1), which is arranged to turn on when the switch 17 is in its "½" position to change an amount of step of the modification of exposure information made by the dial 15 to the ½ step. A numeral 102 denotes a change-over switch (hereinafter referred to as switch SWCHG1'), which is arranged to turn on when the switch 17 is in its "1/3×" position to change an amount of step of the modification of exposure information made by the dial 15 to the ⅓ step. A numeral 103 denotes a change-over switch (hereinafter referred to as switch SWCHG2), which is arranged to turn on when the switch 21 is in its "½" position to change an amount of step of the modification of exposure information made by the dial 30 to the ½ step. A numeral 104 denotes a change-over switch (hereinafter referred to as switch SWCHG2'), which is arranged to turn on when the switch 21 is in its "⅓" position to change an amount of step of the modification of exposure information made by the dial 30 to the ⅓ step.

FIG. 9 shows the details of each of the dial circuits 55 and 56. In FIG. 9, a reference numeral 90 denotes an up-down counter. Numerals 91 and 92 denote OR gates. A numeral 93 denotes a counter. A numeral 94 denotes a parallel-to-serial conversion circuit. The OR gate 91 outputs a high-level output to clear the counters 90 and 93 when a terminal RESET is at a high level. Therefore, the counters 90 and 93 begin to operate when the level of the terminal RESET becomes low.

Figure 11A:
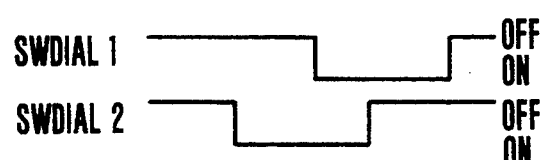
FIGS. 11(a) and 11(b) are timing charts.
Figure 11B:
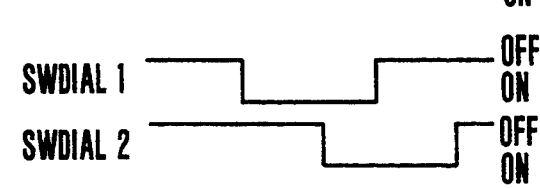
Figure 12A:
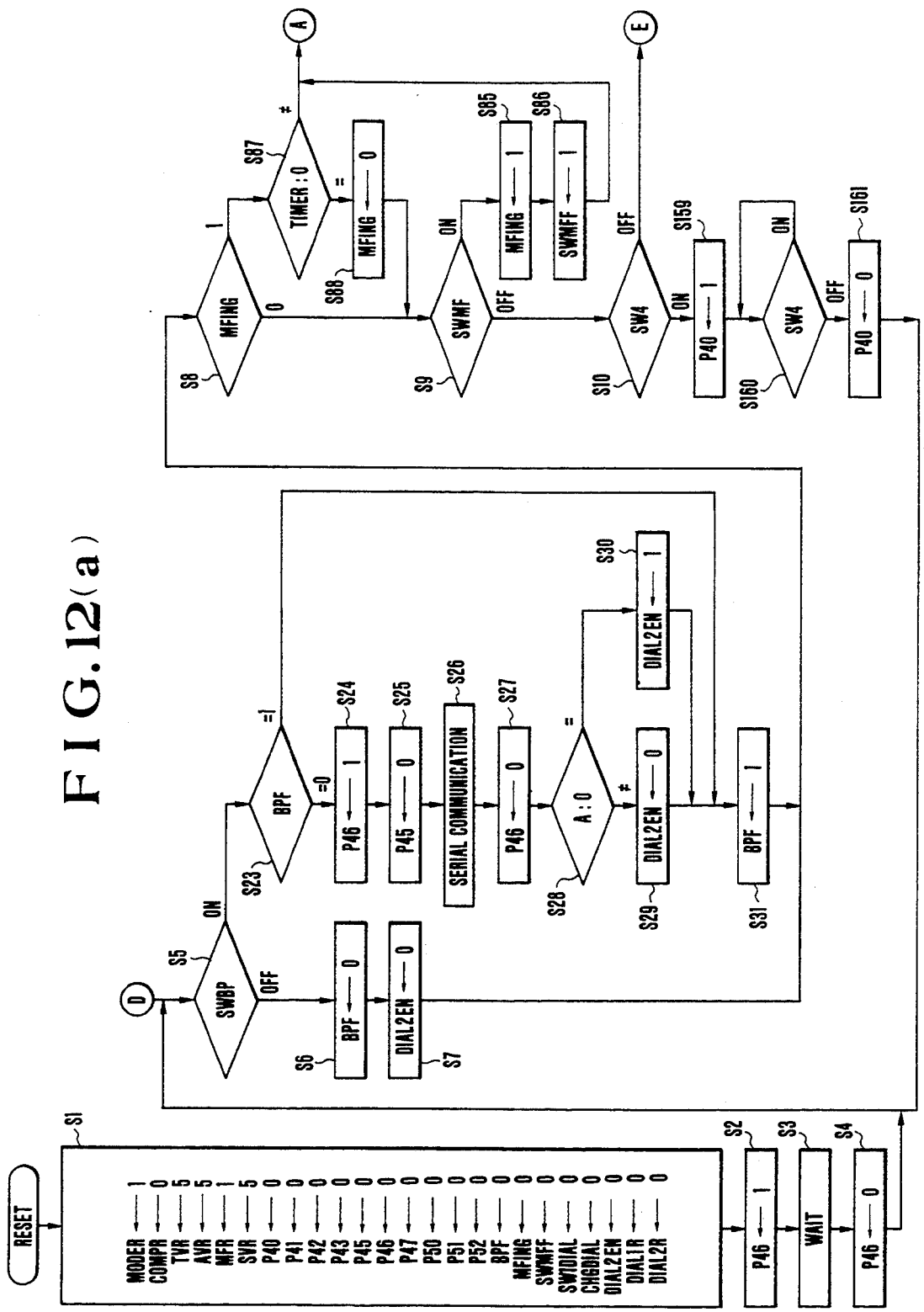
FIGS. 12(a), 12(b), 13(a) to 13(c) and 14(a) to 14(d) are flow charts showing the operation of the first embodiment.
Figure 12B:
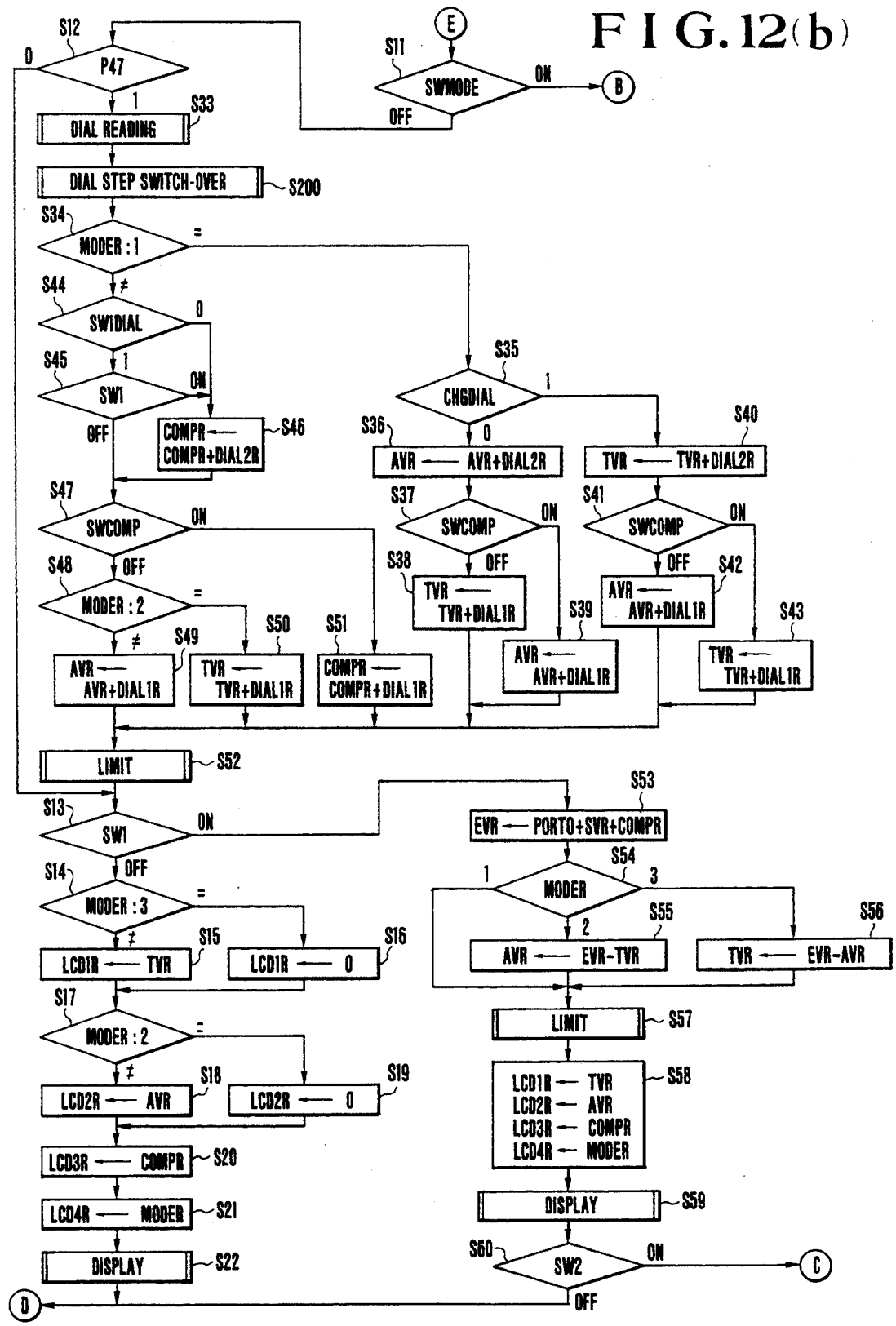
Figure 13A:
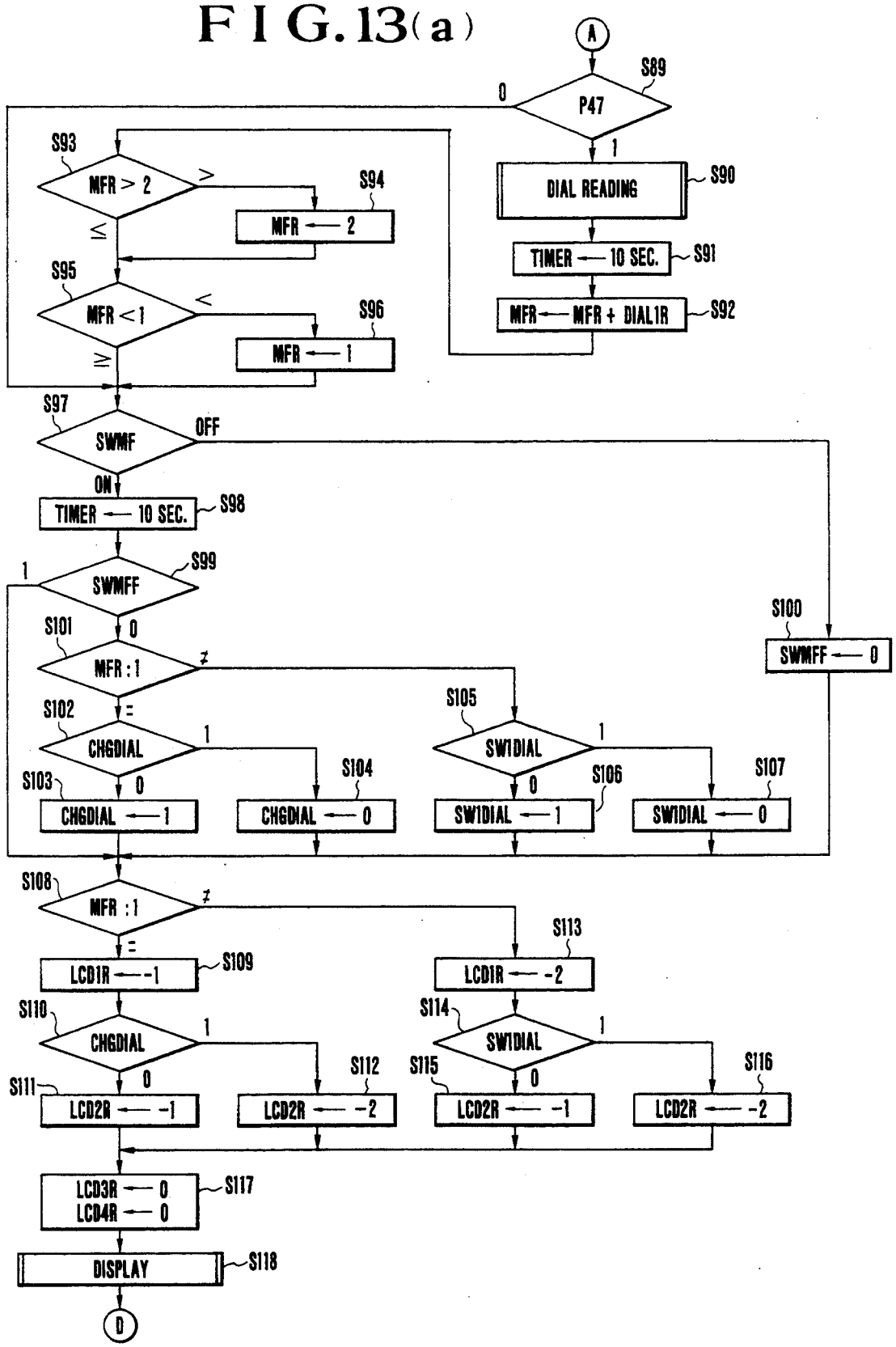
Figures 13B, 13C:
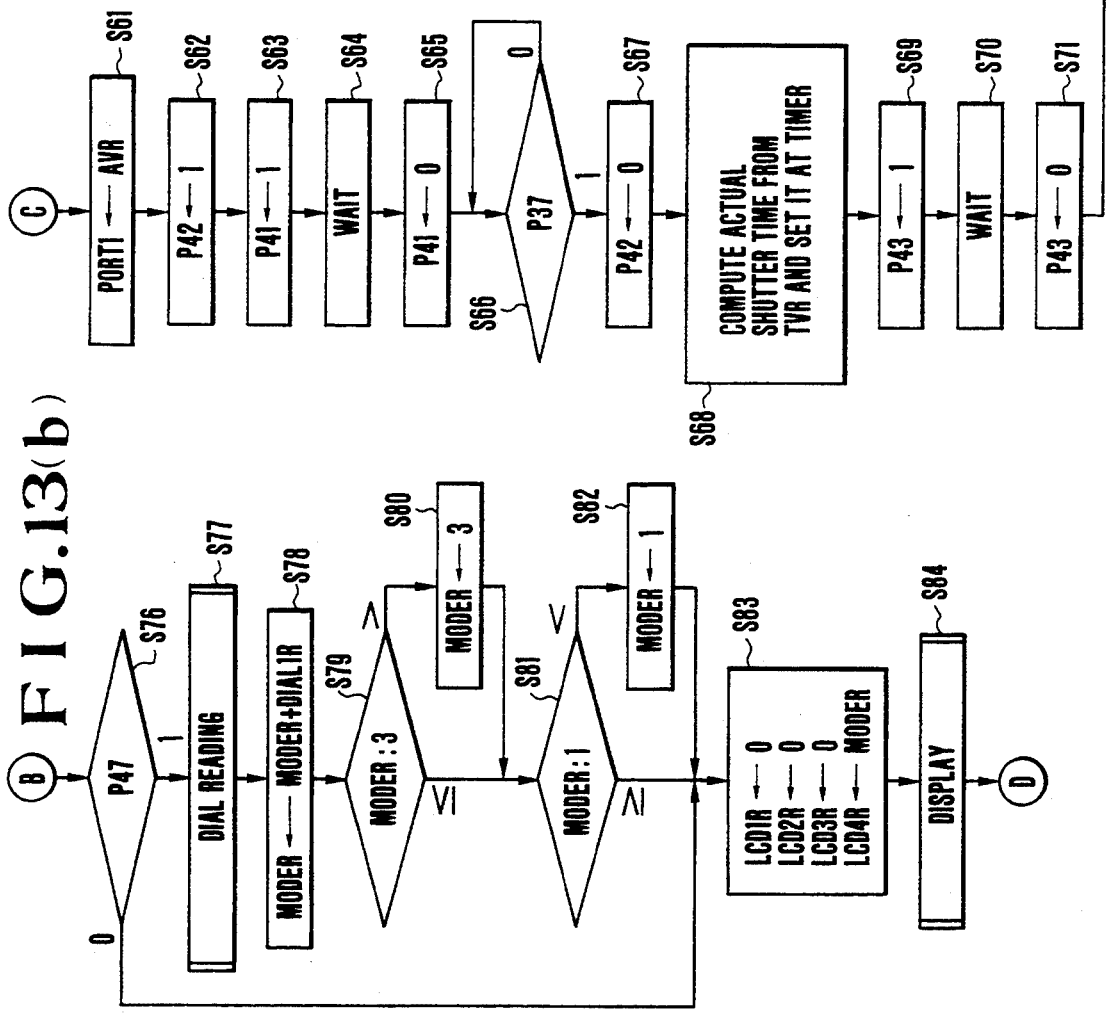

The input terminals UP/DOWN and CLK of the up-down counter 90 are connected respectively to dial switches SWDIAL1 and SWDIAL2. In the case of the dial circuit 56, the terminal 31b corresponds to the dial switch SWDIAL1 and the terminal 31c to the dial switch SWDIAL2. The dial switches SWDIAL1 and SWDIAL2 of the dial circuit 55 are connected to dial contacts connected to the other dial 15 although it is not shown as the dial circuit 55 and is arranged in the same manner as the dial circuit 56. The following describes the dial circuit 56:

When the dial 30 is rotated clockwise to a degree of one click, its output signal changes in such a manner that the dial switch SWDIAL2 is turned on, the dial switch SWDIAL1 is turned on, the dial switch SWDIAL2 is turned off and, then, the dial switch SWDIAL1 is turned off, in a sequence as shown in FIG. 11(a). The up-down counter 90 is arranged to count when the level of its clock terminal CLK rises to a high level. Therefore, the up-down counter 90 counts down as the dial switch SWDIAL1 is in an on-state when the other dial switch SWDIAL2 turns off. When the dial 30 is rotated counterclockwise to the degree of one click, its output signal changes in such a manner that the dial switch SWDIAL1 is turned on, the dial switch SWDIAL2 is turned on, the dial switch SWDIAL1 is turned off and, then, the dial switch SWDIAL2 is turned off, in a sequence as shown in FIG. 11(b). Therefore, the up-down counter 90 counts up as the dial switch SWDIAL1 is in its off-state when the dial switch SWDIAL2 turns off.

The up-down counter 90 is thus caused to count down at every click when the dial 30 rotates clockwise and to count up when the dial 30 rotates counterclockwise. The OR gate 92 outputs a high-level output when the output of the up-down counter 90 is not at zero.

When the level of a terminal REQ of the dial circuit 56 becomes high, the CPU 50 determines that the dial 30 is rotated and performs serial communication. In synchronism with a clock signal supplied to a terminal SCLK, the dial circuit 56 outputs the counted value of the up-down counter 90 to a terminal SOUT as serial data. At the same time, the counter 93 counts the waveform of the clock signal supplied to the terminal SCLK and outputs a high-level output to the OR gate 91 when eight clock pulses (for one round of communication) are counted.

The output level of the OR gate 91 changes to a high level to simultaneously clear the up-down counter 90 and the counter 93. When the counter 93 is cleared, the counter 93 lowers the level of its output to the OR gate 91 and comes back to its initial state.

The counted value produced by the dial 30 thus can be read while clearing the up-down counter 90 every time communication is performed for eight bits.

The operation of the circuit arrangement of the camera described above is described as follows referring to flow charts shown in FIGS. 12(a), 12(b), 13(a), 13(b), 13(c), 14(a), 14(b), 14(c) and 14(d): It is assumed that, in the initial state of the camera, all the switches are off, thus indicating that the back lid 20 is open with the film having been completely wound up.

When the power supply switch 52 is closed, the voltage of the power supply 51 is supplied to the terminal VCC. The capacitor 54 is gradually charged through the resistor 53. The CPU 50 is reset by causing the level of the terminal RES of the CPU 50 to be low for a given period of time. After that, the CPU 50 begins to serially operate from a part "RESET" of the flow chart of FIG. 12(a):

Step S1

Registers, ports and flags are initialized. In the flow chart, symbols MODER, COMPR, TVR, AVR, MFR, SVR, DIAL1R and DIAL2R denote registers disposed within the CPU 50. Pertinent values are substituted for the values of these registers. The register MODER indicates a manual mode when its value is "1"; a shutter priority mode when the value is "2"; and an aperture priority mode when the value is "3".

Symbols BPF, MFING, SWMFF, SW1DIAL, CHGDIAL and DIAL2EN denote flags disposed within the CPU 50. All these flags are cleared to "0". Further, each of the output ports is also cleared.

Step S2

A high-level signal is outputted to the output terminal P46.

Step S3

The flow of operation waits for a given period of time.

Step S4

The level of the output port P46 is lowered. The dial circuits 55 and 56 are reset by the steps S2 to S4.

Step S 5

A check is made for the state of the back lid switch SWBP. The flow proceeds to a step S6 if the back lid 20 is open or comes to a step S23 if the back lid 20 is closed.

Step S6

The flag BPF for the state of the back lid 20 is cleared.

Step S7

The flag DIAL2EN which indicates the presence or absence of the dial 30 is cleared.

Step S8

A check is made for the state of the flag MFING which shows multi-function setting. The flow comes to a step S87 if the flag MFING is at "1" or comes to a step S9 if the flag MFING is at "0".

Step S9

The MF (multi-function) switch 87 (SWMF) is checked for its state. The flow comes to a step S10 if the switch 87 (SWMF) is found off.

Step S10

The MR switch 85 (SW4) is checked for its state. The flow comes to a step S11 if the MR switch 85 is found to be off.

Step S11

The mode switch 86 (SWMODE) is checked for its state. The flow comes to a step S12 as the mode switch 86 is found off.

Step S12

The input port P47 is checked for its state. The input port P47 is at "0" if the dial 30 has not been rotated. In this instance, therefore, the flow comes to a step S13.

Step S13

The light measurement switch 82 (SW1) is checked for its state. The flow comes to a step S14 if the switch 82 is found to be off.

Step S14

A check is made for the state of the AE mode register MODER. If the register MODER is at "3" (indicating the aperture priority mode), the flow comes to a step S16. If not, the flow comes to a step S15.

Step S15

The value of the shutter register TVR is transferred to a buffer LCD1R for the LCD display.

Step S16

The buffer LCD1R is cleared to "0".

Step S17

The AE mode register MODER is checked to find if the AE mode register MODER is at "2" (indicating the shutter priority mode). If so, the flow comes to a step S19. If not, the flow comes to S18.

Step S18

The value of the aperture register AVR is transferred to a buffer LCD2R for the LCD display.

Step S19

The buffer LCD2R is cleared to "0".

Step S20

The value of the register COMPR is stored at a buffer LCD3R for the LCD display.

Step S21

The value of the register MODER is stored at a buffer LCD4R for the LCD display.

Through the steps S14 to S21, therefore, a value "5" (the value of the shutter register TVR set by the step S1) is stored at the LCD display buffer LCD1R; a value "5" (the value of the aperture register AVR set also by the step S1) is stored at the LCD display buffer LCD2R; a value "0" is stored at the LCD buffer LCD3R; and a value "1" is stored at the LCD buffer LCD4R.

Step S22

A display subroutine is called to have a display made by the LCD display device 58.

Figure 14A:
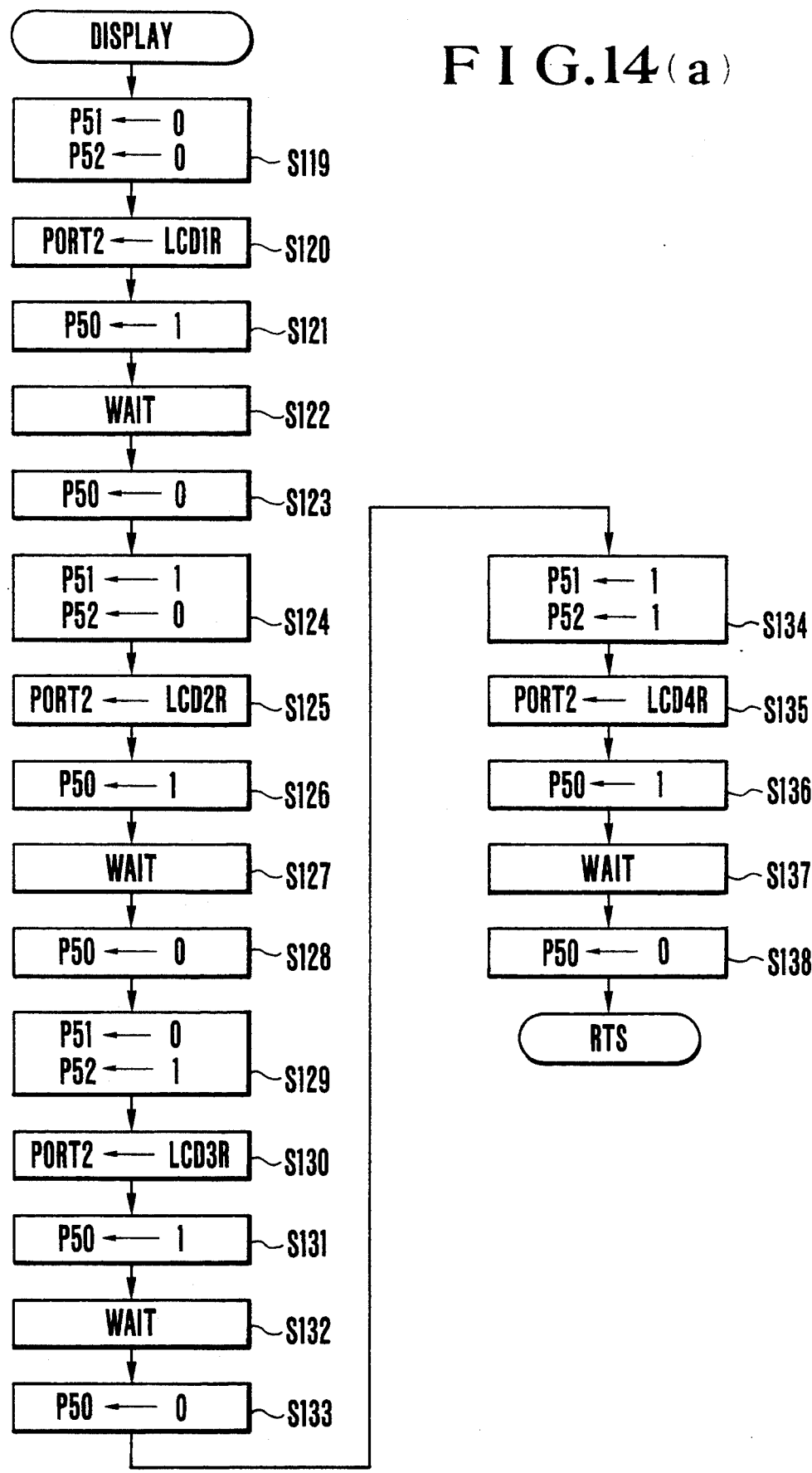

Referring to FIG. 14(a), the display subroutine is described as follows:

Step S119

A value "00" is outputted to addresses A0 and A1.

Step S120

The value of the buffer LCD1R for the LCD display is outputted to the output port PORT2. The value is "5" in this instance. Step S121

A high-level signal is outputted to the output port P50.

Step S122

The flow waits for a given period of time.

Step S123

Figure 10F:
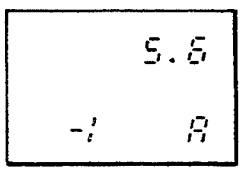
Figure 10B:
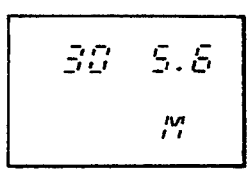

The level of the output port P50 is brought back to a low level. By the steps S121 to S123, the high-level signal of the output port P50 causes the LCD display circuit 57 to make a display by taking in information on the address and data. In this instance, "30" is displayed as shown in FIG. 10(b). This display indicates that the shutter time (speed) is set at 1/30 sec.

Figure 10G:
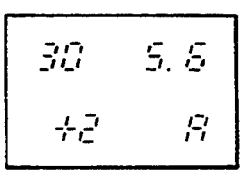
Figure 10C:
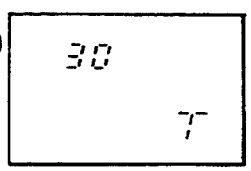
Figure 10H:
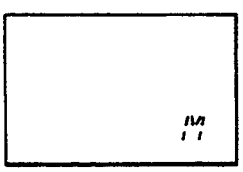
Figure 10D:
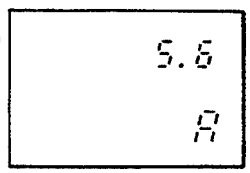

At steps S124 to S138, the values of other LCD display buffers are likewise taken in serially at applicable addresses as follows: The value of the LCD display buffer LCD2R is taken in at an address "01"; the value of the LCD display buffer LCD3R at an address "10"; and the value of the LCD display buffer LCD4R at an address "11". As a result, the LCD display device 58 displays that the shutter time is 1/30 sec, the aperture value is F5.6 and the mode is a manual mode M, as shown in FIG. 10(b). If the register MODER is at "2" (indicating the shutter priority mode), the steps S14 to S21 are executed to set the LCD display buffer LCD1R, the register TVR, the LCD display buffer LCD2R and the LCD display buffer LCD3R at "0" and the LCD display buffer LCD2R at "2". As a result, the display is made as shown in FIG. 10(c). Further, in a case where the register MODER is at "3", the display is made as shown in FIG. 10(d). If the camera is not operated at all and every switch is in an off-state as described above, control over a loop of steps S5—S10—S11—S13—S22—S5 is repeatedly executed. The mode, the shutter time, the aperture value, etc. are thus continuously displayed. Hereinafter, this loop is called a main loop. When the back lid 20 is closed during the repeating process of the main loop control, the flow branches to a step S23 from the step S5.

Step S23

A check is made for the state of the flag BPF. Since the flag BPF has been set at "0" by the step S6, the flow proceeds to a step S24.

Step S24

A signal "1" is outputted to the output port P46 to reset the dial circuits 55 and 56.

Step S25

A signal "0" is outputted to the output port P45. Therefore, the output level of the inverter 71 becomes high. The AND gates 69 and 67 are opened to select the dial circuit 56 which is disposed on the side of the back lid 20.

Step S26

Serial communication is performed. The serial communication clock signal of the CPU 50 is sent to the terminal SCLK of the dial circuit 56 through the AND gate 69. In synchronism with this clock signal, the value of the up-down counter 90 is read out and is stored in an accumulator register (hereinafter referred to as register A) of the CPU 50. The firm mounting of the back lid 20 can be confirmed by the arrangement which enables the value of the up-down counter 90 to be read out.

Step S27

The state of the output port P46 is brought back to "0".

Step S28

A check is made for the value of the register A. Since the level of the terminal RESET of the dial circuit 56 is high, the up-down counter 20 is cleared. All the serial outputs of the dial circuit 56 then become zero. Therefore, the flow branches to a step S30 to set the flag DIAL2EN.

In a case where an ordinary back lid, having no dial circuit such as the dial circuit 56, is mounted, all the terminals 16a to 16f are opened and the levels of all the data of the serial communication become high. The value of the register A is, therefore, not zero and the flag DIAL2EN is cleared at the step S29.

Step S31

After the flag BPF is set, the flow comes back to the step S8. When the flow again comes back to the step S5 through the display subroutine, the flow branches from the step S23 to a step S31 as the flag BPF has been set. Then, the dial circuits 55 and 56 are not reset. Therefore, when the back lid 20 is closed, the dial circuits 55 and 56 are reset only once and also a discrimination between the presence and absence of the dial circuit 56 can be made. Further, when the back lid 20 is opened again, the flag BPF is cleared by the step S6. Therefore, the dial circuits 55 and 56 can be reset once every time the back lid 20 is opened and closed.

When the dial 15 or the dial 30 is rotated while the dial circuit 56 is in connection as the back lid 20 is in a closed state, the level of the terminals REQ of the dial circuits 55 and 56 rise to high levels, which cause the level of the input port P47 to become high through the OR gate 65. Therefore, the flow branches from the step S12 to a step S33.

Step S33

A dial reading subroutine is called.

Figure 14B:
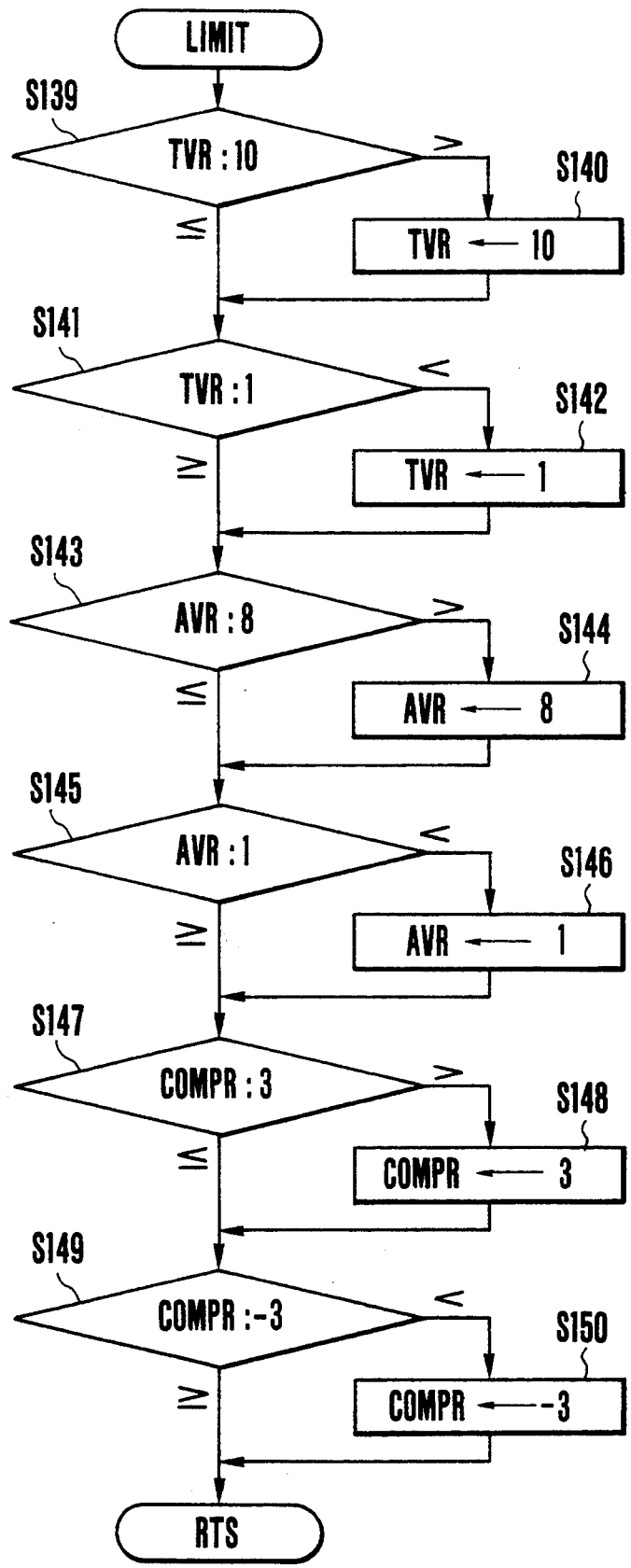
Figure 14D:
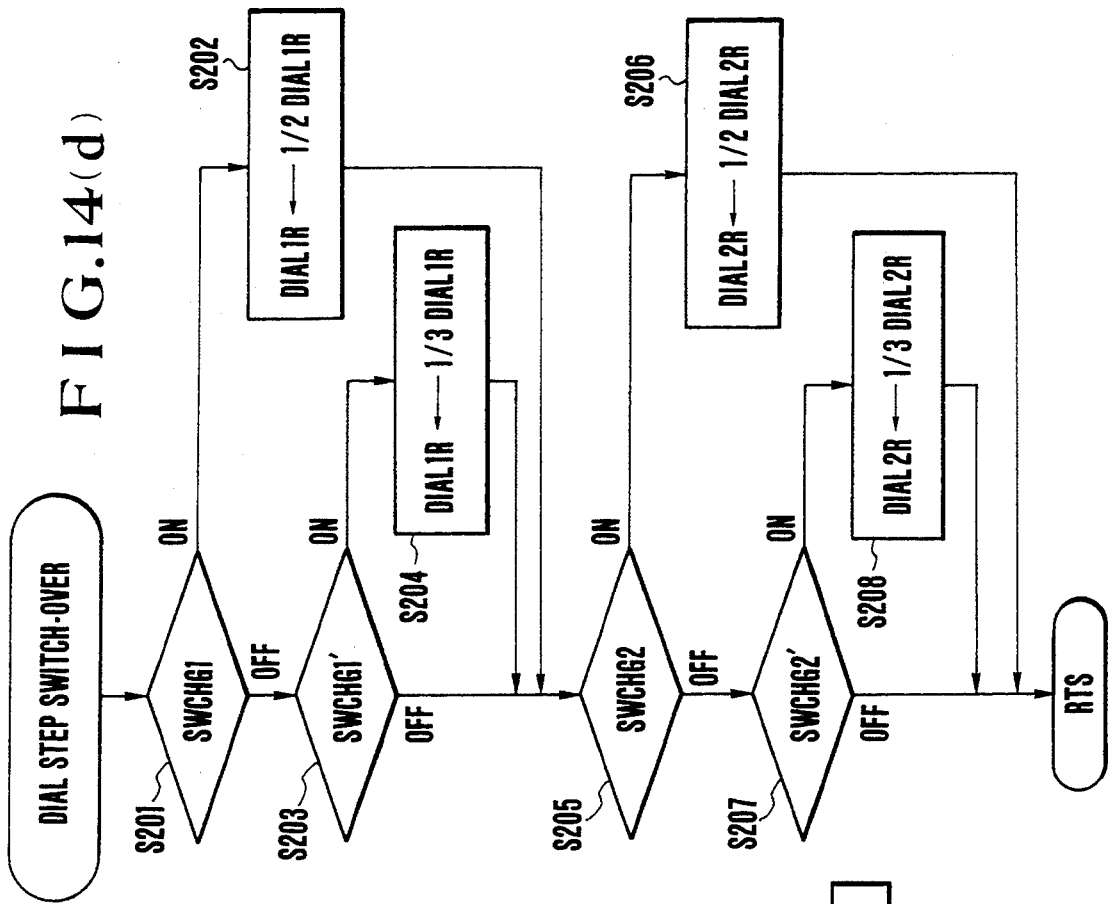
Figure 14C:
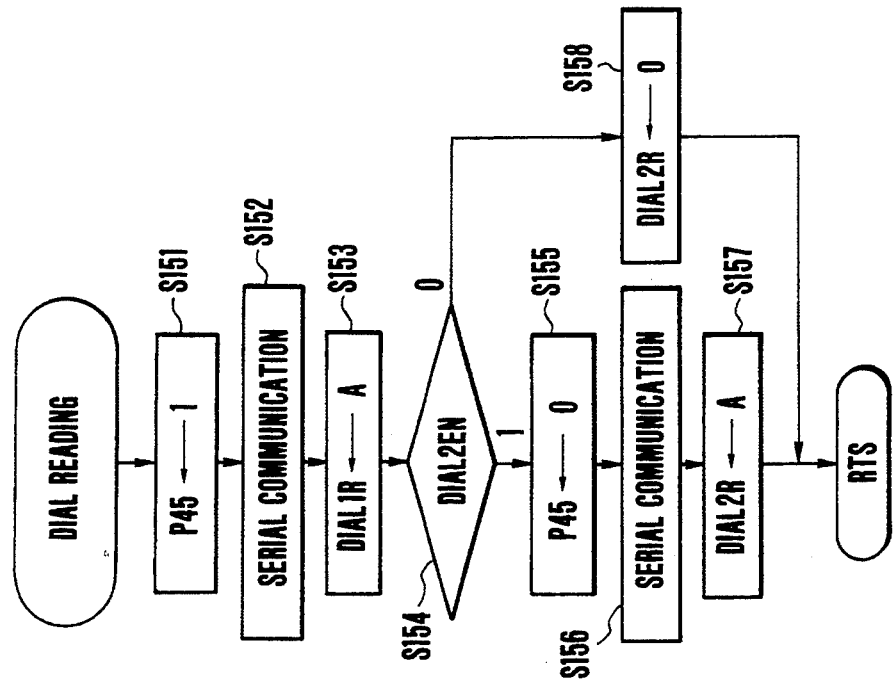

The dial reading subroutine is described as follows with reference to FIG. 14(c):

Step S151

A signal "1" is outputted to the output port P45. This signal causes the output level of the inverter 71 to become low and the AND gates 68 and 70 to open. As a result, the dial circuit 55, which is disposed on the side of the camera body 10, is selected.

Step S152

Serial communication is performed. The serial communication clock signal of the CPU 50 (terminal SCLK) is sent to the terminal SCLK of the dial circuit 55 via the AND gate 70. In synchronism with the clock signal, the value of the up-down counter 90 is read out and stored in the register A of the CPU 50 via the AND gate 68.

Step S153

The value of the register A is stored at the register DIAL1R (the count register for the dial 15).

Step S154

A check is made for the state of the flag DIAL2EN. If the flag DIAL2EN is at "1" with the dial circuit 56 in connection, the flow comes to a step S155.

Step S155

A signal "0" is outputted to the output port P45 to select the dial circuit 56 disposed on the side of the back lid 20.

Steps S156 and S157

Serial communication is performed, like the steps S152 and S153, to write the value of the up-down counter 90 into the register DIAL2R and the flow comes back to the main flow.

In a case where the dial circuit 56 for the back lid dial 30 is not connected, the flow branches from the step S154 to a step S158. At the step S158, the register DIAL2R is cleared and the flow comes back to the main flow to proceed to a step S200. The counted value of the dial 15 thus can be read out and written into the register DIAL1R and that of the other dial 30 into the register DIAL2R by the dial reading subroutine.

Step S200

A dial step switch-over subroutine is called.

The dial step switch-over subroutine is described as follows with reference to FIG. 14(d):

Step S201

A check is made for the state of the change-over switch 101 (SWCHG1). If the switch 101 is on, the flow proceeds to a step S202. At the step S202, the value of the register DIAL1R is replaced with a value which is ½ of the value of the register DIAL1R and the flow comes to a step S205. If the change-over switch 101 is found to be off at the step S201, the flow comes to a step S203.

Step S203

A check is made for the state of the change-over switch 102 (SWCHG1'). If the switch 102 is on, the flow proceeds to a step S204.

Step S204

The value of the register DIAL1R is replaced with a value which is ½ of the value of the register DIAL1R and the flow comes to the step S205. If the switch 102 is found off at the step S203, the flow comes to the step S205.

With the state of the switch SWCHG1 and that of the switch SWCHG1' thus detected, according to the position of the switch 17, the counted value of the dial 15 can be read into the register DIAL1R by one step, by ½ step or by ⅓ step.

Steps S205 to S208 are executed, like the steps S201 to S204, as follows: The counted value of the dial 30 is read into the register DIAL2R by one step, by ½ step or by ⅓ step according to the position of the switch 21. After that, the flow comes back to the main flow to proceed to a step S34.

Step S34

The register MODER for the AE mode is checked to find if its value is "1" (indicating the manual mode). If so, the flow proceeds to a step S35.

Step S35

A check is made for the state of the flag CHGDIAL for switch-over of setting between TV and AV in the manual mode. Since the flag CHGDIAL has been cleared by the step S1 in this case, the flow proceeds to a step S36.

Step S36

The value of the dial count register DIAL2R disposed on the side of the back lid 20 is added to the aperture register AVR.

By this step, the aperture value can be changed by an amount corresponding to the number of clicks made accordingly as the dial 30 is rotated. For example, if the dial 30 is rotated counterclockwise to the degree of two clicks, the value of the up-down counter 90 becomes "2". With the switch 21 at the position of "½", the value of the register DIAL2R then becomes "1". The value of the aperture register AVR thus becomes "5+1", i.e., "6".

Step S37

A check is made for the state of the switch SWCOMP (exposure compensation switch). If the switch SWCOMP is found off, the flow comes to a step S38.

Step S38

The value of the dial count register DIAL1R, which is disposed on the side of the camera body 10 is added to the shutter register TVR. The shutter time can be changed by this step. For example, if the dial 15 is rotated clockwise to the degree of one click with the switch 17 in the position of "1", the value of the up-down counter 90 becomes "−1". Therefore, the value of the register DIAL1R also become "−1" to have the shutter register TVR set at a value "5−1", which is "4".

At a step S52, a limit subroutine is called.

The limit subroutine is described as follows with reference to FIG. 14(b):

Step S139

A check is made to find if the shutter register TVR is at a value larger than "10".

Step S140

If the value of the shutter register TVR is found to be larger than "10", it is set at "10".

Step S141

A check is made to find if the shutter register TVR is at a value smaller than "1".

Step S142

If the value of the shutter register TVR is found to be smaller than "1", the shutter register TVR is set at "1". Therefore, if the shutter register TVR is at a value between "1" and "10", the value is left intact. If the value is larger than "10" or smaller than "1", a limit is applied by changing the value either to "10" or to "1".

Steps S143 to S150

These steps are executed likewise by limiting the value of the aperture register AVR to values between "1" and "8" and by limiting the value of the exposure compensation register COMPR to values between "−3" and "3". After that, the flow comes back to the main flow.

Figure 10I:
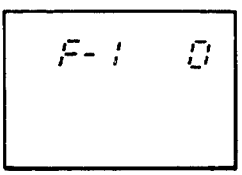
Figure 10E:
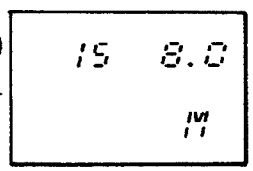

At steps S14 to S22, the LCD is caused to make a display. However, since the value of the shutter register TVR is "4" and that of the aperture register AVR "7" in this instance, the display is made as shown in FIG. 10(e).

As described above, the shutter time is variable by the dial 15 and the aperture value by the dial 30 by one step, by ½ step or by ⅓ step as desired. Besides, the resultant change can be confirmed on the LCD display.

In a case where the dial circuit 56 is not provided on the back lid 20 or where the back lid 20 is open, the aperture value is not variable at the step S36 as the dial count register DIAL2R for the dial 30 is always cleared to zero by the step S158. In such a case, when the dial 15 is rotated while pushing the exposure compensation switch 88 (SWCOMP), the flow branches at the step S37 to a step S39.

Step S39

The value of the dial count register DIAL1R for the dial 15 is added to the aperture register AVR.

Therefore, the aperture value can be changed by rotating the dial 15 while pushing the exposure compensation switch 88 (SWCOMP). The shutter time can be changed by rotating the dial 15 without pushing the exposure compensation switch 88 (SWCOMP).

The user of the camera sometimes wishes to have the roles of the dials 15 and 30 interchanged. To meet this requirement, the flag CHGDIAL is provided for switchover between TV (shutter time value) setting and AV (aperture value) setting in the manual mode.

In a case where the flag CHGDIAL is set in a function setting mode which will be described later, the flow branches from the step S35 to a step S40.

Steps S40 to S43

These steps are the same as the steps S36 to S39, except that the shutter register TVR and the aperture register AVR are completely interchanged with each other. Therefore, the aperture can be changed by one step with the dial 15 and the shutter time by ½ or ⅓ step with the dial 30. It is of course possible to change the shutter time by turning on the exposure compensation switch 88 (SWCOMP) and to change the aperture value by turning off the switch 88.

In a case where the AE mode register MODER is at a value other than "1", indicating either the shutter priority mode or the aperture priority mode, the flow branches from the step S34 to a step S44.

Step S44

A check is made for the state of the flag SW1DIAL. Since this flag has been cleared at the step S1, the flow comes to a step S46.

Step S46

The value of the dial count register DIAL2R for the dial 30 is added to the exposure compensation register COMPR. Therefore, by rotating the dial 30, the exposure compensation value of the register COMPR can be changed by one step, by ½ or by ⅓ step. For example, the value of the register DIAL2R can be made to become "2" by rotating the dial 30 counterclockwise to a degree of two clicks. Therefore, the value of the exposure compensation register COMPR becomes "1" when the switch 21 is in the position of "½.

Step S47

A check is made for the state of the exposure compensation switch 88 (SWCOMP). If the switch 88 is found off, the flow comes to a step S48.

Step 48

A check is made for the state of the AE mode register MODER. If the mode register MODER indicates the shutter priority mode, the flow comes to a step S50. If the mode register MODER indicates the aperture priority mode, the flow comes to a step S49. Therefore, by rotating the dial 15, the shutter time value can be changed, in the shutter priority mode, while the aperture value also can be changed in the case of the aperture priority mode.

After the upper and lower limits are imposed at the step S52, each applicable mode is displayed. However, since the exposure compensation register COMPR is at "1", the display becomes as shown in FIG. 10(f).

In a case where the dial circuit 56 is not connected like in the case of the manual mode, the flow of operation branches from the step S47 to the step S51 when the dial 15 is rotated while turning on the exposure compensation switch 88 (SWCOMP), so that the exposure compensation value can be varied.

If the user does not like to have the exposure compensation easily varied, the flag SW1DIAL can be set in a function setting mode which will be described later. In that instance, the flow comes from the step S44 to a step S45.

Step S45

A check is made for the state of the light measurement switch 82 (SW1). If the switch 82 (SW1) is found off, the flow does not come to the step S46. In that event, therefore, the exposure compensation value cannot be varied by rotating the dial 30.

The exposure compensation value becomes variable only by rotating the dial 30 while turning on the light measurement switch 82 (SW1) at the same time.

The mode is variable by turning on the mode switch 86 (SWMODE). When the mode switch 86 (SWMODE) is turned on while the display is continuously made during the loop of the main flow, the flow branches from the step S11 to a step S76.

Step S76

If the dial is not rotated, the input port P47 is at "0". In that case, therefore, the flow comes to a step S83.

Step S83

The LCD display buffers LCD1R to LCD3R are cleared. The value of the AE mode register MODER is stored at the LCD display buffer LCD4R.

Step S84

The display subroutine is called. Then, only the current mode is displayed as shown in FIG. 10(h). After that, the flow comes back to the main flow. Then, while the mode switch 86 (SWMODE) remains in the on-state thereof, a loop of flow is made in a sequence of steps S5—S10—S11—S76—S84—S5. When the dial 15 is rotated while the mode switch 86 (SWMODE) remains on, the level of the input port P47 becomes high and the flow comes from the step S76 to a step S77.

Step S77

The dial reading subroutine is called.

Step S78

The value of the dial count register DIAL1R for the dial 15 is added to the AE mode register MODER.

Steps S79 to S82

This is a routine for limiting the mode selection to the mode selection values between "1" and "3". This routine enables the photographer (user) to vary the mode in a sequence of "the manual mode M—the shutter priority mode T—the aperture priority mode A" by rotating the dial counterclockwise and in a sequence of "the mode A—the mode T—the mode M" by rotating the dial clockwise. When the mode switch 86 (SWMODE) is turned off after completion of the process of setting a desired mode, the flow comes back to the main loop to have a display made in accordance with the newly set mode.

When the photographer pushes the shutter release button down to a first stroke position, aiming the camera at an object to be photographed, during the process of the main loop of flow, the light measurement switch 82 (SW1) is turned on. The flow branches from the step S13 to a step S53 when exposure compensation by means of the dial 30 becomes possible at the step S45.

Step S53

The luminance of the object is measured through the port PORT0 and an A/D converted value of the luminance is read. To this value are added a film sensitivity value and an exposure compensation value. In this instance, the value of the film sensitivity register SVR is "5" (an APEX value for the ISO sensitivity value "100"), as set in the step S1. The exposure compensation value is a value set at the exposure compensation register COMPR. The result of this operation is stored at the ISO register EVR.

Step S54

A check is made for the AE mode. The flow comes to a step S55 if the mode is the shutter priority mode; to a step S56 if the mode is the aperture priority mode; or to a step S57 if the mode is the manual mode.

Step S55

An apposite aperture value is computed according to the formula of "EV—TV" and the aperture value thus obtained is stored at the aperture register AVR.

Step S56

An apposite shutter time value is computed according to the formula of "EV—AV" and the shutter time value thus obtained is stored at the shutter register TVR.

Step S57

The limit subroutine is called for the purpose of limiting the registers TVR and AVR.

A computing operation in each of the modes can be accomplished in the manner described above.

Step S58

The value of the register TVR is transferred to the LCD display buffer LCD1R, the value of the register AVR to the LCD display buffer LCD2R, the value of the register COMPR to the LCD display buffer LCD3R and the value of the register MODER to the LCD display buffer LCD4R.

Step S59

The display subroutine is called. The LCD display device 58 is thus caused to make a display as shown in FIG. 10(g). All the parts of displays made for different modes are in common with each other except the mode display part.

Step S60

A check is made for the state of the exposure switch 83 (SW2). If the exposure switch 83 is not on, the flow comes back to the step S5 to repeat the loop of steps S5—S10—S12—S13—S59—S5 to execute a light measurement display until the light measurement switch 82 (SW1) turns off. If the photographer pushes the shutter release button further to a second stroke position of the button when the light measurement value is displayed, the exposure switch 83 (SW2) turns on. Therefore, at that time, the flow comes from the step S60 to a step S61.

Step S61

The value of the aperture register AVR (aperture value) is outputted to the output port PORT1.

Steps S62 and S63

High-level signals are outputted to the output ports P41 and P42 to turn on the transistors 77 and 79. With the transistors 77 and 79 turned on, currents are applied to the electromagnets 76 and 78. Then, mechanical clamping, which is not shown, is removed by the electromagnet 78 to move a mirror upward while the diaphragm aperture is stopped down by the electromagnet 76.

Steps S64 and S65

The flow waits for a given period of time and, then, the current applied to the electromagnet 78 is brought to a stop.

Step S66

The flow waits for completion of the stopping-down of the aperture. When the magnet 76 is energized with the current after removal of the clamping, the aperture is mechanically stopped down. When the aperture is stopped down to a predetermined value position, the diaphragm driving circuit 64 outputs a high-level signal to bring the input port P37 into a state of "1", which indicates the end of the aperture control.

Step S67

The current applied to the electromagnet 76 is cut off by lowering the output level of the output port P42.

Step S68

An actual time value is computed from the APEX value of the shutter time TV and a timer is set accordingly.

Steps S69 to S71

A current is applied to the electromagnet 74 to allow the leading shutter curtain to travel.

Step S72

The flow waits for expiration of the actual time set at the timer.

Steps S73 to S75

A current is applied to the electromagnet 72 to allow the trailing shutter curtain to travel.

The aperture and the shutter time thus can be controlled in the above-stated manner. The flow comes back to the main flow after completion of a series of shutter release processes. Upon return to the main loop of flow, the flow branches from the step S10 to a step S159 as the MR switch 85 (SW4), which is arranged to turn on when the mirror is moved upward and to turn off upon completion of the film winding is in an on-state.

Step S159

A signal "1" is outputted to the output port P40 to turn on the transistor 81. With the transistor 81 turned on, a current is applied to the motor 80 to cause a film winding process to begin.

Step S160

The flow waits until the MR switch 85 (SW4) turns off.

Step S161

When one frame portion of the film is wound completely, the current applied to the motor is cut off.

The light measurement, exposure and film winding processes can be controlled in the above-stated manner.

In the last place, a function setting mode is described as follows: The camera can be set into the function setting mode by turning the MF switch 87 (SWMF) on. When the MF switch 87 (SWMF) turns on during the repeating process of the main loop of flow, the flow comes to branch from the step S9 to a step S85.

Step S85

The flag MFING which is arranged to indicate the setting of a multi-function is set at "1".

Step S86

The flag SWMFF which is arranged to indicate the state of the MF switch 87 is set at "1" and the flow comes to a step S89.

Step S89

A check is made to find if the dial is rotated. If not, the flow comes to a step S97.

Step S97

A check is made for the state of the MF switch 87 (SWMF). If the switch 87 is found on, the flow proceeds to a step S98.

Step S98

A time value of 10 sec is set at the timer.

Step S99

A check is made for the state of the flag SWMFF. Since the flag SWMFF has already been set at the step S86 in this instance, the flow comes to a step S108.

Step S108

A check is made for the value of the MF setting register MFR. Since the register MFR has been set at "1" at the step S1, the flow proceeds to a step S109.

Step S109

A value "−1" is set at the LCD display buffer LCD1R.

Step S110

A check is made for the state of the flag CHGDIAL, which is arranged to indicate switch-over between setting of the shutter time TV and setting of the aperture value AV in the case of the manual mode.

Step S111

If the flag CHGDIAL is at "0", "−1" is set at the LCD display buffer LCD2R.

Step S112

If the flag CHGDIAL is at "1", "−2" is set at the LCD display buffer LCD2R.

Step S117

The LCD display buffers LCD3R and LCD4R are cleared.

Step S118

The display subroutine is called. A display in this case becomes as shown in FIG. 10(i). Referring to FIG. 10(i), a part "F−1" indicates that the flag CHGDIAL is being changed. Another part "0" indicates that the flag CHGDIAL is at "0". More specifically, the display indicates that, in the manual mode, the dial 15 is to be used for setting a shutter time value and the dial 30 for setting an aperture value. After the display, the flow comes back to the main flow.

When the flow again comes to the step S8, the flow branches from the step S8 to a step S87 as the flag MFING has been set this time. The flow then jumps to a step S89 until expiration of a period of 10 sec as counted by the timer. The timer continues to be set at a step S98 as long as the MF switch 87 (SWMF) remains on. Therefore, the function setting mode continues as long as the MF switch 87 is on.

When the MF switch 87 (SWMF) is turned on, the flow branches from the step S97 to a step S100.

Step S100

The flag SWMFF, which is arranged to indicate the state of the MF switch 87 (SEMF) is cleared. Since the timer is not set at this time, the flow comes back to the step S5 with the MF switch 87 (SWMF) left off. Then, a loop of steps S5—S8—S87—S100—S5 is repeatedly executed. When the period of 10 sec elapses during the repeated execution of of this loop, the value of the timer becomes "0" and the flow comes from the step S87 to a step S88. At the step S88, the flag MFING is cleared to terminate the function setting mode. The flow then comes back to the main loop.

If the MF switch 87 (SWMF) is again turned on during the process of the function setting mode, the flow comes from the step S97 to a step S98.

Step S98

The timer is set at 10 sec.

Step S99

Since the flag SWMFF has been cleared at the step S100, the flow this time comes to a step S101.

Step S101

A check is made to find if the value of the MF setting register MFR is "1". Since this value is "1", the flow proceeds to a step S102.

Steps S102 to S104

The flag CHGDIAL is inverted.

As described above, the function setting mode is obtained by turning on the flag SWMFF by setting it at "1". After that, the flag can be inverted by again turning the flag on after the flag is turned off once, so that the function of the flag CHGDIAL can be set.

If the dial 15 is rotated in the function setting mode, the level of the input port P47 becomes high and the flow comes from the step S89 to a step S90.

Step S90

The dial reading subroutine is called.

Step S91

The timer is set at 10 sec. Therefore, the time of the timer is extended every time the dial is rotated.

Step S92

The value of the dial count register DIAL1R for the dial 15 is added to the MF setting register MFR.

Steps S93 to S96

This is a routine for limiting the multi-function mode between "1" and "2". By this routine, the function in process of setting can be switched from a function "F−1" over to a function "F−2" by rotating the dial counterclockwise and from "F−2" to "F−1" by rotating the dial clockwise. Further, "1" indicates that the TV setting and the AV setting are being in process of switch-over while "2" indicates that the exposure compensation is in process of setting.

In the case of the register MFR=2, that is, in the case of the flag SW1DIAL, the flag SW1DIAL is switched from one state over to another with the MF switch 87 (SWMF) operated again at steps S105 to S107, in the same manner as in the case of the flag CHGDIAL. The result of this switch-over is displayed at steps S113 to S116.

The functions of the camera thus can be set as desired by the arrangement described.

As apparent from the foregoing description, the embodiment is arranged to permit accurate, fine and smooth inputting of necessary exposure information, as desired by the photographer, using at least two digital signal input means in conjunction with the arrangement for varying the amount of step of modification of exposure information values inputted by the digital signal input means.

Next, a second embodiment of this invention is described below with reference to FIGS. 15 to 18:

The second embodiment is in most part arranged in the same manner as the first embodiment described. The description of the second embodiment and the drawings thereof is, therefore, limited to only such points that differ from the first embodiment.

Figure 15:
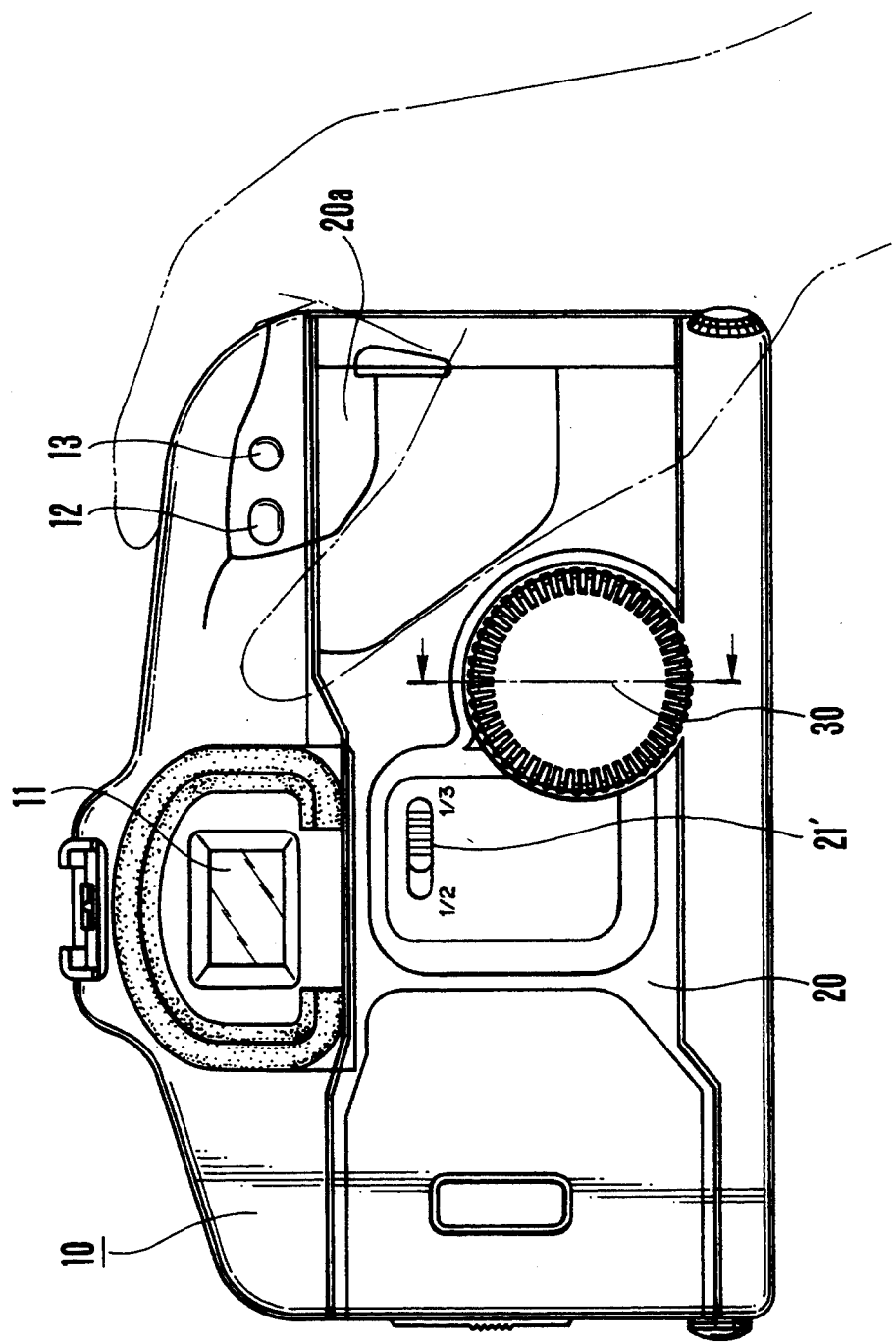
FIG. 15 shows the back lid of a camera arranged as a second embodiment of the invention.
Figure 16:
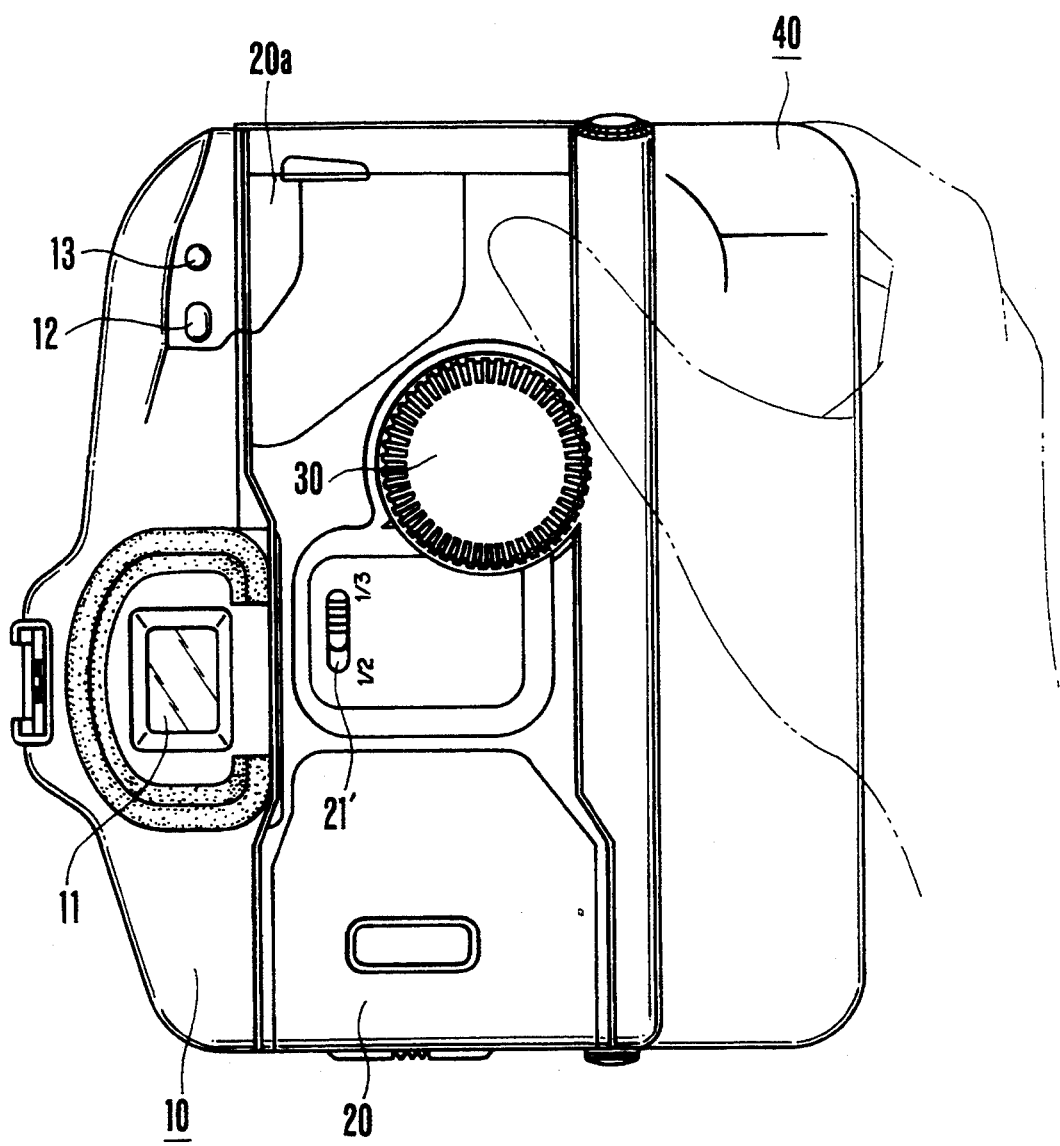
FIG. 16 is a rear view showing the camera of FIG. 15 as in a vertical shooting posture with a high-speed film winding device mounted thereon.

In FIGS. 15 and 16, a reference numeral 21' denotes a switch, which is arranged to permit switching an amount of step of modification of to an exposure control value such as the amount of exposure compensation, the aperture value, etc. inputted by the dial 30 over to ½ step or to ⅓ step. In the case of the second embodiment, the three-position switch 17 of the first embodiment is omitted, and the amount of step of modification of an exposure information value by means of the dial 15 is limited to one step.

Figure 8:
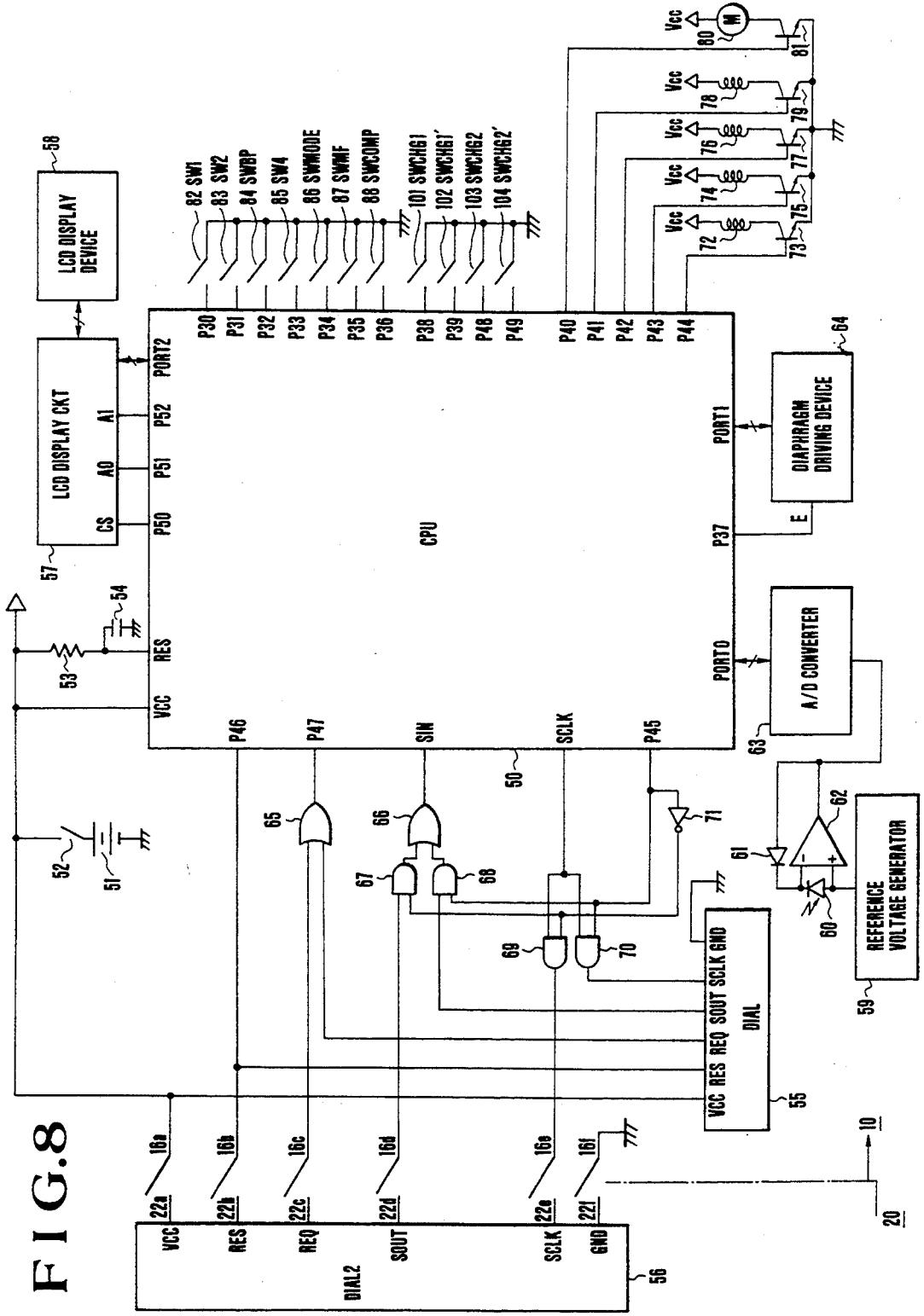
FIG. 8 is a circuit diagram showing the whole circuit arrangement of the first embodiment.

In FIG. 17, it is only an intermediate step change-over switch (or switch SWCHG) 89 that differs from the arrangement of the first embodiment shown in FIG. 8. The switch 89 (SWCHG) is arranged to switch the exposure information changing step over to ½ when the switch 21' is turned on and to ⅓ step when the switch 21' is turned off.

Figure 18:
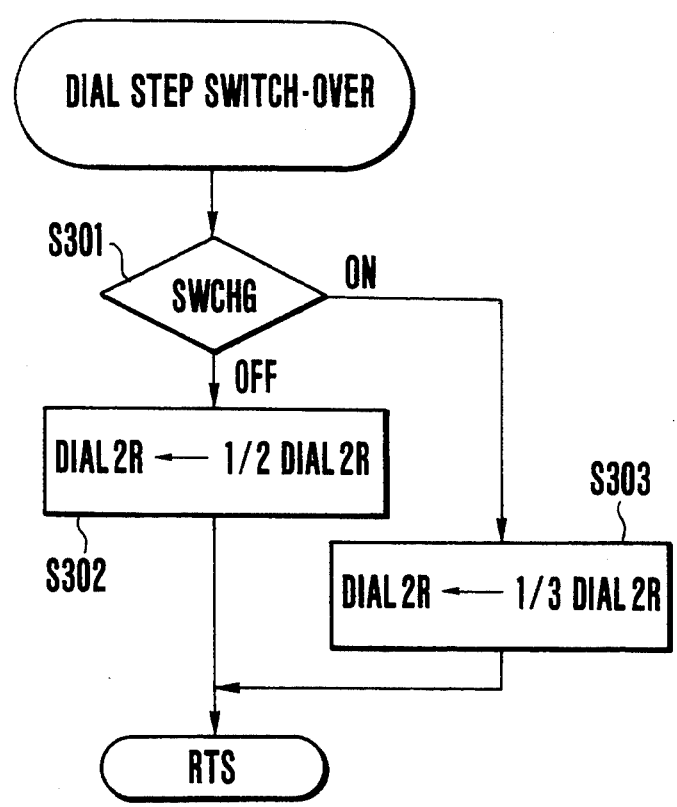
FIG. 18 is a flow chart of the operation of the second embodiment showing only a part where the operation differs from that of the first embodiment.

In respect to flow charts, the flow of operation of the second embodiment differs from that of the first embodiment only in a dial step switch-over subroutine as shown in FIG. 18.

Referring to FIG. 18, the dial step switch-over subroutine is described as follows:

Step S301

A check is made for the state of the intermediate step change-over switch 89 (SWCHG). If the change-over switch 89 is found on, the flow comes to a step S303 to replace the value of the register DIAL2R with a value which is ½ thereof. If the change-over switch 89 is found off, the flow comes to a step S302 to replace the value of the register DIAL2R with a value which is ⅓ thereof. After that, the flow comes back to the main flow to proceed to the step S34.

The dial step switch-over subroutine is executed to have the counted value of the dial 30 read out and set in the register DIAL2R by ½ or ⅓ step according to a switching operation performed on the switch 21'.

Such being the arrangement, the shutter time can be varied by one step with the dial 15 and the aperture value by ½ or ⅓ step with the dial 30. The results of such variations are confirmable on the LCD display.

It is also possible to vary the aperture value by one step with the dial 15 instead of the dial 30, and the shutter time by ½ or ⅓ with the dial 30 instead of the dial 15. Further, it is also possible to vary the exposure compensation value of the register COMPR by ½ or ⅓ step by rotating the dial 30.

As described above, the second embodiment is arranged to permit the interchange of first information and second information by first digital signal input means and second digital signal input means; and to vary the amount of step of modification of each of the exposure information values also by these digital signal input means. Therefore, necessary exposure information can be more accurately and more smoothly inputted according to the intention of the photographer with excellent operability. The second embodiment can be simply arranged at a low cost to permit the input of exposure information by means of the operation members set as desired.

What is claimed is:

1. A camera, comprising:
   a first digital signal input means for inputting a first exposure information value;
   a second digital signal input means for inputting a second exposure information value;
   a processing circuit arranged to receive a signal from each of said first and second digital signal input means and to process the inputted exposure information values;
   a first switch-over means for changing a size of an increment by which the first exposure information value inputted by said first digital signal input means is changed; and
   a second switch-over means for changing a size of an increment by which the second exposure information value inputted by said second digital signal input means is changed;
   wherein a change in the size of the increment by which said first exposure information value is changed can be differentiated from a change in the size of the increment by which the second exposure information value is changed by switching over said first switch-over means or said second switch-over means.

2. A camera according to claim 1, wherein said first digital signal input means and said second digital signal input means are arranged to be capable of inputting respective different pieces of exposure information.

3. A camera according to claim 1, wherein said first digital signal input means includes a first operation member and a first conversion means for converting an operation of said first operation member into a digital signal, and wherein said second digital signal input means includes a second operation member and a second conversion means for converting an operation of said second operation member into a digital signal.

4. A camera according to claim 1, wherein said first switch-over means includes a first switch-over operation member and a first increment size conversion means for converting an operation of said first switch-over operation member into a first switch-over signal, and wherein said second switch-over means includes a second switch-over operation member and a second increment size conversion member for converting an operation of said second switch-over operation member into a second switch-over signal.

5. A camera according to claim 1, wherein said processing circuit is arranged to perform a computing operation upon receipt of a signal from each of said first and second digital signal input means.

6. A camera according to claim 1, further comprising information switch-over means for switching over exposure information inputted by said first and second digital signal input means.

7. A camera according to claim 3, wherein at least one of said first and second operation members is a rotary dial.

8. A camera according to claim 3, wherein rotary dials are employed as said first and second operation members, respectively.

9. A camera according to claim 3, wherein said first operation member is disposed adjacent to a shutter release button of said camera and said second operation member is disposed in a rear surface of said camera.

10. A camera, comprising:
 a) a first digital signal input means for inputting a first exposure information value;
 b) a second digital signal input means for inputting a second exposure information value; and
 c) a processing circuit arranged to receive a signal from each of said first and second digital signal input means and to process the inputted exposure information, wherein a change in a size of an increment by which the first exposure information value inputted by said first digital signal input means is changed can be made to be greater than a change in a size of an increment by which the second exposure information value inputted by said second digital signal input means is changed.

11. A camera according to claim 10, wherein said first digital signal input means and said second digital signal input means are arranged to be capable of inputting respective different pieces of exposure information.

12. A camera according to claim 10, wherein said first digital signal input means comprises a first operation member and a first conversion means for converting an operation of said first operation member into a digital signal, and wherein said second digital signal input means comprises a second operation member and a second conversion means for converting an operation of said second operation member into a digital signal.

13. A camera according to claim 10, further comprising switch over means for switching over only the size of the increment by which said second exposure information value inputted by said second digital signal input means is changed.

14. A camera according to claim 10, wherein said processing circuit is arranged to perform a computing operation upon receipt of a signal from each of said first and second digital signal input means.

15. A camera according to claim 10, further comprising an information switch-over means for switching over exposure information inputted by said first and second digital signal input means.

16. A camera according to claim 12, wherein at least one of said first and second operation members is a rotary dial.

17. A camera according to claim 12, wherein rotary dials are employed as said first and second operation members, respectively.

18. A camera according to claim 12, wherein said first operation member is disposed adjacent to a shutter release button of said camera and said second operation member is disposed in a rear surface of said camera.

* * * * *

UNITED STATES PATENT AND TRADEMARK OFFICE
CERTIFICATE OF CORRECTION

PATENT NO. : 5,448,334
DATED : September 5, 1995
INVENTOR(S) : Shoji Kaihara, et al.

It is certified that error appears in the above-indentified patent and that said Letters Patent is hereby corrected as shown below:

COLUMN 1:

Line 21, "shutter" should read --shutter speed--.

COLUMN 2:

Line 1, "input ted" should read --inputted--.

COLUMN 3:

Line 55, "FIG. 8:" should read --FIG. 8.--.

COLUMN 5:

Line 3, "When" should read --when--;
Line 12, ""1/3X"" should read --"1/3"--; and
Line 42, "55" should read --55,--.

COLUMN 8:

Line 30, "instance.  Step S121" should read --instance.  ¶Step S121--.

COLUMN 9:

Line 17, "56" should read --56,--.

UNITED STATES PATENT AND TRADEMARK OFFICE
CERTIFICATE OF CORRECTION

PATENT NO. : 5,448,334
DATED : September 5, 1995
INVENTOR(S) : Shoji Kaihara, et al.

It is certified that error appears in the above-indentified patent and that said Letters Patent is hereby corrected as shown below:

COLUMN 13:

Line 28, ""1/2." should read --"-2"--.

COLUMN 18:

Line 15, "of" (second occurrence) should be deleted.

COLUMN 19:

Line 27, "of" (third occurrence) should be deleted.

This certificate supersedes Certificate of Correction issued January 16, 1996.

Signed and Sealed this

Thirteenth Day of August, 1996

Attest:

BRUCE LEHMAN

Attesting Officer

Commissioner of Patents and Trademarks